(12) United States Patent
Yokono

(10) Patent No.: US 11,422,053 B2
(45) Date of Patent: Aug. 23, 2022

(54) FLUID LEAKAGE DATA MANAGEMENT APPARATUS AND MANAGEMENT SYSTEM

(71) Applicant: TLV Co., Ltd., Kakogawa (JP)

(72) Inventor: Tomoaki Yokono, Kakogawa (JP)

(73) Assignee: TLV Co., Ltd., Kakogawa (JP)

( * ) Notice: Subject to any disclaimer, the term of this patent is extended or adjusted under 35 U.S.C. 154(b) by 0 days.

(21) Appl. No.: 15/517,291

(22) PCT Filed: Aug. 7, 2015

(86) PCT No.: PCT/JP2015/072539
§ 371 (c)(1),
(2) Date: Apr. 6, 2017

(87) PCT Pub. No.: WO2016/056297
PCT Pub. Date: Apr. 14, 2016

(65) Prior Publication Data
US 2017/0307465 A1 Oct. 26, 2017

(30) Foreign Application Priority Data

Oct. 7, 2014 (JP) .............................. JP2014-206546

(51) Int. Cl.
*G01M 3/24* (2006.01)
*G05B 23/02* (2006.01)
*G08B 21/20* (2006.01)

(52) U.S. Cl.
CPC .............. *G01M 3/24* (2013.01); *G05B 23/02* (2013.01); *G08B 21/20* (2013.01); *G01M 3/243* (2013.01)

(58) Field of Classification Search
CPC ........ G01M 3/24; G01M 3/243; G05B 23/02; G05B 21/20
See application file for complete search history.

(56) References Cited

U.S. PATENT DOCUMENTS

| | | |
|---|---|---|
| 5,708,195 A | 1/1998 | Kurisu et al. |
| 6,273,129 B1 | 8/2001 | Chavand et al. |
| 6,609,085 B1 | 8/2003 | Uemura et al. |

(Continued)

FOREIGN PATENT DOCUMENTS

| | | |
|---|---|---|
| JP | 6187581 A | 7/1994 |
| JP | 8171414 A | 7/1996 |

(Continued)

OTHER PUBLICATIONS

Richard Green, Process plant design using Medusa, Computer-Aided Engineering Journal Apr. 1987 (Year: 1987).*

*Primary Examiner* — Matthew G Marini
(74) *Attorney, Agent, or Firm* — The Webb Law Firm

(57) ABSTRACT

A fluid leakage data management apparatus includes an input unit to which data on fluid leak portions collected through a fluid leak diagnosis of a plant is input; a display unit on which the data input to the input unit is displayed; and a data processing unit that displays, on the display unit, a leak portion display image in which, with respect to positional data indicating positions, in the plant, of the respective fluid leak portions input to the input unit, indicators representing the respective fluid leak portions are displayed superimposed on a configuration diagram image of the plant at locations corresponding to the positional data of the respective fluid leak portions on the configuration diagram image.

5 Claims, 17 Drawing Sheets

(56) References Cited

U.S. PATENT DOCUMENTS

| | | | |
|---|---|---|---|
| 10,685,283 B2 * | 6/2020 | Li | G06F 16/248 |
| 2001/0005819 A1 | 6/2001 | Nguyen et al. | |
| 2001/0006384 A1 | 7/2001 | Usaki | |
| 2004/0122602 A1 | 6/2004 | Nagase | |
| 2009/0289924 A1 | 11/2009 | Takata | |
| 2010/0268489 A1 | 10/2010 | Lie et al. | |
| 2011/0292083 A1 | 12/2011 | Nihlwing | |
| 2012/0140063 A1 * | 6/2012 | Shimada | G01C 15/00 |
| | | | 348/135 |
| 2013/0332397 A1 * | 12/2013 | Scolnicov | F17D 5/02 |
| | | | 700/36 |

FOREIGN PATENT DOCUMENTS

| | | | | |
|---|---|---|---|---|
| JP | 11249731 A | | 9/1999 | |
| JP | 200048047 A | | 2/2000 | |
| JP | 2001188608 A | | 7/2001 | |
| JP | 2001337002 A | | 12/2001 | |
| JP | 2002323401 A | | 11/2002 | |
| JP | 2003106927 A | | 4/2003 | |
| JP | 2005114409 A | | 4/2005 | |
| JP | 2005190196 A | | 7/2005 | |
| JP | 2011237597 A | | 11/2011 | |
| JP | 2012133636 A | * | 7/2012 | |
| JP | 2013174581 A | * | 9/2013 | G06T 11/60 |

\* cited by examiner

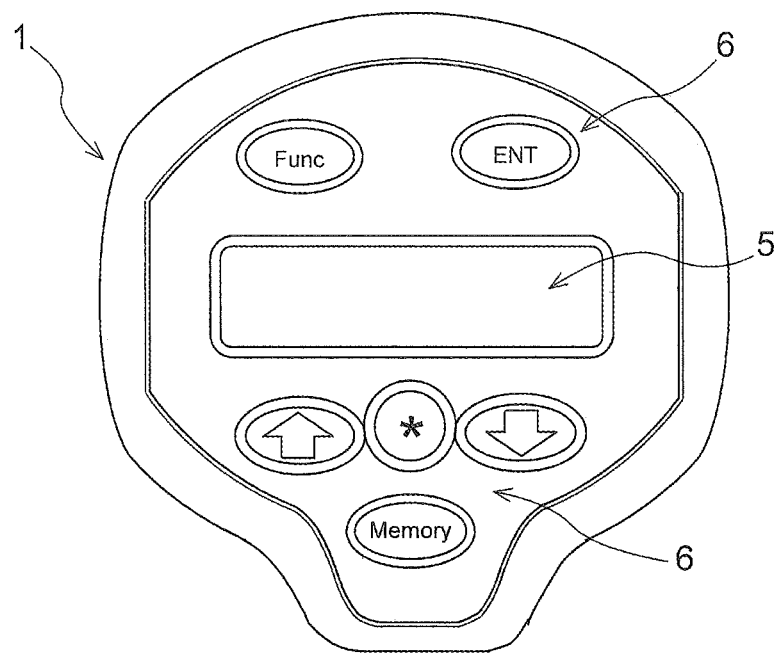
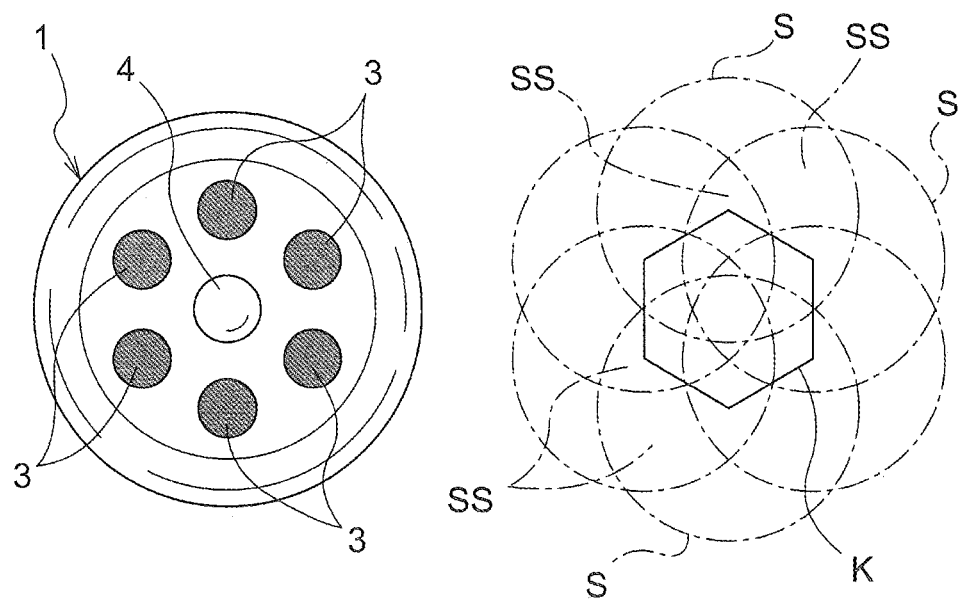

Fig.13

Client name ×××

Filter
Area [ ▼ ]　　Floor [ ▼ ]　　Diagnosis staff [ ▼ ]

| GLC serial No. | Management No. | Date and time of measurement | Diagnosis staff ID | Area | Floor | Target member | Target site | ...... | Fluid used | Operating time |
|---|---|---|---|---|---|---|---|---|---|---|
| 000000 | 001 | 2014/09/02 10:00:00 | Diagnosis staff 1 |  |  | Flange | Gasket |  | Fluid type1 | 8760 |
| 000000 | 002 | 2014/09/02 10:00:00 | Diagnosis staff 1 | Area1 | 1F | Valve | Gland |  | Fluid type2 | 8760 |
| 000000 | 003 | 2014/09/02 10:00:00 | Diagnosis staff 1 | Area1 | 1F | Valve | Gland |  | Fluid type3 | 8760 |
| 000000 | 004 | 2014/09/02 10:10:00 | Diagnosis staff 1 | Area1 | 2F | Valve | Gland |  | Fluid type4 | 8760 |
| 000000 | 005 | 2014/09/02 10:20:00 | Diagnosis staff 1 | Area1 | 2F | Pipe | Union |  | Fluid type4 | 8760 |
| 000000 | 006 | 2014/09/02 10:20:00 | Diagnosis staff 1 | Area2 | 2F | Reducing valve | Main body |  | Fluid type3 | 8760 |
| 000000 | 007 | 2014/09/02 10:30:00 | Diagnosis staff 1 | Area2 | 3F | Filter | Main body |  | Fluid type4 | 8760 |
| 000000 | 008 | 2014/09/02 10:30:00 | Diagnosis staff 1 | Area2 | 3F | Valve | Blow |  | Fluid type4 | 8760 |
| 000000 | 009 | 2014/09/02 10:40:00 | Diagnosis staff 1 | Area2 | 3F | Valve | Blow |  | Fluid type3 | 8760 |
| 000000 | 010 | 2014/09/02 10:40:00 | Diagnosis staff 1 | Area2 | 3F | Reducing valve | Main body |  | ... | ... |
|  | ... | ... | ... |  |  | ... |  |  |  |  |
| 000000 | 030 | 2014/09/03 10:00:00 | Diagnosis staff 1 | Area4 | 2F | Valve | Blow |  | Fluid type4 | 8760 |
| 000000 | 031 | 2014/09/03 10:00:00 | Diagnosis staff 1 | Area4 | 1F | Pipe | Threaded joint portion |  | Fluid type4 | 8760 |
| 000000 | 032 | 2014/09/03 10:10:00 | Diagnosis staff 1 | Area4 | 1F | Reducing valve | Main body |  | Fluid type1 | 8760 |
| 000000 | 033 | 2014/09/03 10:20:00 | Diagnosis staff 1 | Area5 | 1F | Valve | Blow |  | Fluid type1 | 8760 |
| 000000 | 034 | 2014/09/03 10:30:00 | Diagnosis staff 1 | Area5 | 1F | Pipe | Threaded joint portion |  | Fluid type1 | 8760 |
| 000000 | 035 | 2014/09/03 10:30:00 | Diagnosis staff 1 | Area5 | 1F | Reducing valve | Main body |  | Fluid type1 | 8760 |
| 000000 | 036 | 2014/09/03 10:40:00 | Diagnosis staff 1 | Area5 | 1F | Reducing valve | Main body |  | Fluid type1 | 8760 |

| Sheet No. | Amount of leakage | Date of diagnosis | Diagnosis staff |
|---|---|---|---|
| 01-001 | 0.8 | 2014/09/02 | Diagnosis staff1 |

| Area | Area1 |
|---|---|
| Target member | Flange |
| Target site | Gasket |
| Detailed information | North side Branch valve Upstream side Flange |

Details of leak portion

Details of leak portion

} Pb

Arrangement plan

} Pa

| Repairer | | Date of repair | |

| Sheet No. | Amount of leakage | Date of diagnosis | Diagnosis staff |
|---|---|---|---|
| 01-002 | 0.3 | 2014/09/02 | Diagnosis staff1 |

| Area | Area1 |
|---|---|
| Target member | Valve |
| Target site | Gland |
| Detailed information | North side Branch valve |

Details of leak portion

Details of leak portion

} Pb

Arrangement plan

} Pa

| Repairer | | Date of repair | |

| Sheet No. | Amount of leakage | Date of diagnosis | Diagnosis staff |
|---|---|---|---|
| 01-003 | 0.3 | 2014/09/02 | Diagnosis staff1 |

| Area | Area1 |
|---|---|
| Target member | Valve |
| Target site | Gland |
| Detailed information | North side Main line Valve |

Details of leak portion

Details of leak portion

} Pb

| Sheet No. | Amount of leakage | Date of diagnosis | Diagnosis staff |
|---|---|---|---|
| 01-004 | 0.7 | 2014/09/02 | Diagnosis staff1 |

| Area | Area1 |
|---|---|
| Target member | Valve |
| Target site | Gland |
| Detailed information | West side Nitrogen header Branch valve |

Details of leak portion

Details of leak portion

} Pb

S

| | Fluid name | Amount of leakage [Nm³/h] | Number of leak portions | Monetary value of leakage [Yen/y] | Number of repaired portions | Monetary value of repair [Yen/y] | Repair completion rate [%] |
|---|---|---|---|---|---|---|---|
| 1 | Fluid type1 | 4.5 | 6 | 1,971,000 | 1 | 350,400 | 16.7% |
| 2 | Fluid type2 | 1.7 | 4 | 744,600 | 2 | 481,800 | 50.0% |
| 3 | Fluid type3 | 0.5 | 2 | 219,000 | 1 | 131,400 | 50.0% |
| 4 | Fluid type4 | 13.5 | 36 | 5,913,000 | 14 | 2,277,600 | 38.9% |
| 5 | Fluid type5 | 88.2 | 196 | 38,631,600 | 65 | 12,307,800 | 33.2% |
| | Total | | 244 | 47,479,200 | 83 | 15,549,000 | 34.0% |

Fig.18

| Monetary conversion table | | | | | | | |
|---|---|---|---|---|---|---|---|
| | Fluid name | Amount of leakage [Nm³/h] | Number of leak portions | Monetary value of leakage [Yen/y] | Number of repaired portions | Monetary value of repair [Yen/y] | Repair completion rate [%] |
| 1 | Fluid type1 | 4.5 | 6 | 1,971,000 | 1 | 350,400 | 16.7% |
| 2 | Fluid type2 | 1.7 | 4 | 744,600 | 2 | 481,800 | 50.0% |
| | ⋮ | ⋮ | ⋮ | ⋮ | ⋮ | ⋮ | ⋮ |
| | Total | | 244 | 47,479,200 | 83 | 15,549,000 | 34.0% |

← M

| List of leak portions | | | | | | |
|---|---|---|---|---|---|---|
| Sheet No. | Area | Fluid name | Diagnosis point | ... | Monetary value of leakage [Yen/y] | Repaired |
| 01-001 | Area1 | Fluid type1 | North side Branch valve Upstream side Flange | ... | 350,400 | ● |
| 01-002 | Area1 | Fluid type1 | North side Branch valve | ... | 131,400 | |
| 01-003 | Area1 | Fluid type2 | North side Main line Valve | ... | 131,400 | |
| ⋮ | ⋮ | ⋮ | ⋮ | | ⋮ | ⋮ |

Overall map

[Plant layout] ← Pe

Repair schedule

| Sheet No. | Amount of leakage | Date of diagnosis | Diagnosis staff |
|---|---|---|---|
| 01-001 | 0.8 | 2014/09/02 | Diagnosis staff1 |

| Area | Area1 |
|---|---|
| Target member | Flange |
| Target site | Gasket |
| Detailed information | North side Branch valve Upstream side Flange |
| Details of leak portion | |

← S

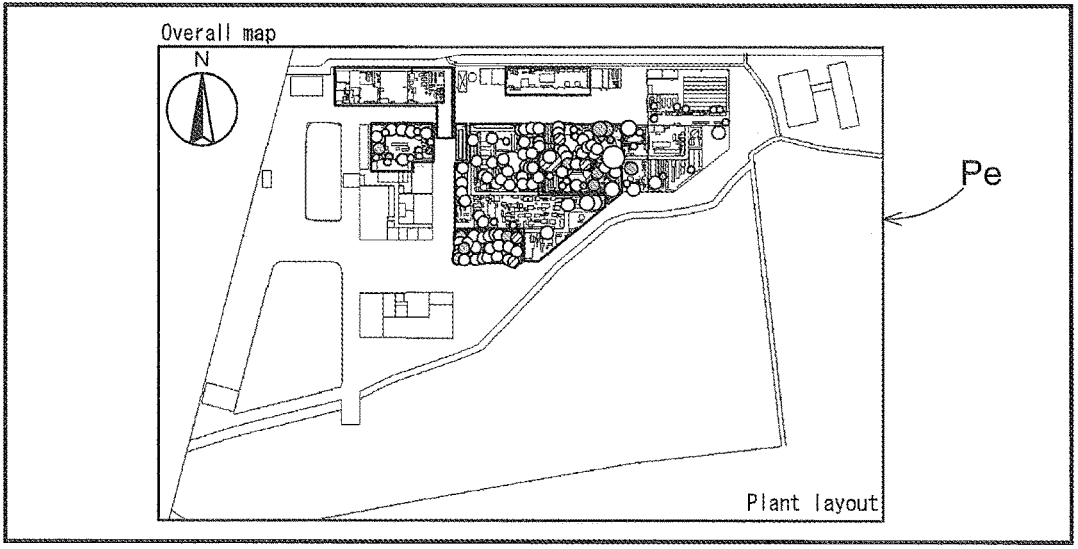

FLUID LEAKAGE DATA MANAGEMENT APPARATUS AND MANAGEMENT SYSTEM

CROSS-REFERENCE TO RELATED APPLICATIONS

This application is the United States national phase of International Application No. PCT/JP2015/072539 filed Aug. 7, 2015, and claims priority to Japanese Patent Application No. 2014-206546 filed Oct. 7, 2014, the disclosures of which are hereby incorporated in their entirety by reference.

TECHNICAL FIELD

The present invention relates to a fluid leakage data management apparatus and management system for managing data on fluid leak portions collected through a fluid leak diagnosis of a plant.

BACKGROUND ART

In production activities at plants of various fields such as the petroleum refining industry, petrochemical industry, general chemical industry, steel industry, heavy industry, automobile industry, and food and drink industry, various fluids such as various gases (hydrogen, nitrogen, town gas, argon, carbon dioxide, carbonic acid gas, etc.), air, and steam are used. In these types of plants, deterioration over time of a piping system and a vessel system as a result of production activities at the plants and poor maintenance and construction of the plants may result in the occurrence of fluid leaks from the piping system and the vessel system. Such fluid leaks waste energy and incur costs in production activities at the plants, and may also lead to an accident if the leaking fluid is a combustible or toxic gas. Therefore, accurately diagnosing a portion of a plant at which a fluid leak is occurring and repairing that portion (i.e., maintenance of the plant) is crucially important in terms of energy and cost savings and safety.

Typically, fluid leak portions are repaired at a later date after the fluid leak portions have been identified through an operation for diagnosing a fluid leak portion. In order to facilitate the repair of detected fluid leak portions, Patent Document 1 proposes, as a leakage detecting device that is used for the operation for diagnosing a fluid leak portion, a portable leakage detecting device including a microphone for detecting ultrasonic waves generated at a fluid leak portion; input means for inputting positional information of the leak portion; photographic means for photographing the leak portion; display means for displaying the positional information input by the input means and a photographed image of the leak portion obtained by the photographic means; data processing means for associating with one another and storing output data from the microphone, the positional information input by the input means, and the photographed image obtained by the photographic means with respect to the same leak portion; and computing means for computing the amount of fluid leakage at the corresponding leak portion.

Since the device proposed in Patent Document 1 stores data in which the output data from the microphone, the input positional information, and the photographed image of each leak portion are associated with one another, it is easy for a repairer to identify a fluid leak portion by using this data, and the operating efficiency advantageously improves.

PRIOR ART DOCUMENTS

Patent Documents

Patent Document 1; JP 2003-106927A

SUMMARY

However, the above-described data is used by merely referring to data on individual fluid leak portions separately, and there is room for improvement in the method for making use of the data on fluid leak portions collected by the device proposed in Patent Document 1.

For example, it takes much time and effort to repair fluid leak portions, and in order to save such time and effort, there is a demand for a method for making use of data in such a manner as not only to make it easy to identify fluid leak portions but also to make it possible to devise a repair plan according to what repairs can be performed efficiently.

Moreover, in a plant, a fluid leak occurs due to deterioration over time of a piping system or a vessel system as a result of production activities at the plant, and therefore, even if a fluid leak portion is completely repaired, a fluid leak will occur again somewhere in the plant over the course of time. For this reason, in order to avoid problems that are caused by fluid leaks in terms of energy and cost savings and safety, it is necessary to periodically perform maintenance of the plant. However, granted that maintenance is periodically performed, the frequency of occurrence of fluid leaks differs from plant to plant, and furthermore, even in the same plant, fluid leaks occur in clusters in some areas and not in other areas. Therefore, it is necessary to devise a maintenance plan that takes into account the trend of fluid leaks in a plant such as those described above. Under these conditions, there is a demand for a method that makes use of data in such a manner as to be able to comprehend the trend of fluid leaks in a plant.

In view of these circumstances, a primary object of the present disclosure is to provide a fluid leakage data management apparatus and management system with which data on fluid leak portions collected through a fluid leak diagnosis of a plant can be effectively used.

A fluid leakage data management apparatus according to the present disclosure is a fluid leakage data management apparatus, including:

an input unit to which data on fluid leak portions collected through a fluid leak diagnosis of a plant is input;

a display unit on which the data input to the input unit is displayed; and a data processing unit that displays, on the display unit, a leak portion display image in which, with respect to positional data indicating positions, in the plant, of the respective fluid leak portions input to the input unit, indicators representing the respective fluid leak portions are displayed superimposed on a configuration diagram image of the plant at locations corresponding to the positional data of the respective fluid leak portions on the configuration diagram image.

With this configuration, it is possible to precisely comprehend the trend of fluid leaks in a plant, such as an area in which fluid leaks occur in clusters, an area in which not many fluid leaks occur, and the like, from a distribution of the indicators on the configuration diagram image of the plant.

Thus, it is possible to devise an efficient plan for future maintenance, for example, which area should be diagnosed with high priority, taking into account the trend of fluid leaks in the plant. Moreover, it is possible to deduce the extent of deterioration of equipment and a defect in the equipment from the trend of fluid leaks in the plant indicated by the distribution of the indicators. For example, with respect to an area in the target plant where a large number of fluid leak portions are present, it can be deduced that the equipment has deteriorated, or if the number of fluid leak portions is abnormally large, it can be deduced that some kind of defect has occurred in the equipment. In this manner, it is possible to perform various analyses based on the trend of fluid leaks in the plant by making use of the leak portion display image.

Furthermore, it is possible to clearly comprehend the positional relationship of the fluid leak portions in the plant from the positional relationship of the indicators on the leak portion display image, and thus, it is possible to devise an efficient repair plan including, for example, the order in which the fluid leak portions are to be repaired.

Here, a fluid leak diagnosis of a plant refers to diagnosing a fluid leak from each portion of a piping system and a vessel system of a plant.

Preferred aspects of the fluid leakage data management apparatus according to the present disclosure will be described below. However, the scope of the present disclosure is not limited to the following examples of preferred aspects.

According to an aspect, it is preferable that the data processing unit is configured to display the indicators displayed on the leak portion display image in a state in which the indicators are associated with an amount of fluid leakage at the respective corresponding fluid leak portions.

With this configuration, it is possible to even more precisely comprehend the trend of fluid leaks in the plant, including not only the distribution of fluid leak portions in the plant but also the distribution of the amounts of fluid leakage, by using the leak portion display image. Thus, analyses based on the trend of fluid leaks in the plant, such as the devising of a future maintenance plan and the deduction of the extent of deterioration of the equipment and a defect, can be more accurately performed.

Moreover, only fluid leak portions at which the amount of fluid leakage is equal to or more than a certain amount are intended to be repaired, it is possible to easily narrow down fluid leak portions to be repaired by using the leak portion display image according to this configuration, and it is possible to easily devise a repair plan for those fluid leak portions.

According to an aspect, it is preferable that the data processing unit is configured to display the indicators displayed on the leak portion display image in a state in which the indicators are associated with the type of leaking fluid at the respective corresponding fluid leak portions.

With this configuration, it is possible to even more precisely comprehend the trend of fluid leaks in the plant, including not only the distribution of fluid leak portions in the plant but also the distribution of the types of leaking fluid, by using the leak portion display image. Thus, analyses such as the devising of a future maintenance plan based on the trend of fluid leaks in the plant and the deduction of the extent of deterioration of the equipment and a defect can be more accurately performed.

Moreover, only fluid leak portions related to a specific type of leaking fluid are intended to be repaired, it is possible to easily narrow down fluid leak portions to be repaired by using the leak portion display image according to this configuration, and it is possible to easily devise a repair plan for those fluid leak portions.

According to an aspect, it is preferable that the management apparatus further includes a leaking fluid type selecting unit that makes an instruction to select the type of leaking fluid, and the data processing unit is configured to display only the indicators associated with one or two or more selected types of leaking fluid on the display unit, in accordance with a selection instruction made by the leaking fluid type selecting unit.

With this configuration, since only the indicators indicating the type of leaking fluid that is focused on are displayed on the leak portion display image, it is possible to clearly comprehend the trend of fluid leaks related to the type of leaking fluid that is focused on, and thus, it is possible to easily perform an analysis focusing on a specific type of leaking fluid.

According to an aspect, it is preferable that the management apparatus further includes a scaling instructing unit that makes an instruction to scale up or down the leak portion display image displayed on the display unit, and the data processing unit is configured to scale up or down the leak portion display image and display the resulting leak portion display image on the display unit, in accordance with an instruction made by the scaling instructing unit.

With this configuration, since only a region that is focused on in the plant is displayed, it is possible to clearly comprehend the trend of fluid leaks in that specific region, and thus, it is possible to easily perform an analysis focusing on a specific region.

According to an aspect, it is preferable that the management apparatus further includes a ratio instructing unit that makes an instruction for a ratio for uniformly changing the size of all the indicators displayed on the display unit at a fixed ratio, and the data processing unit is configured to uniformly change the size of all the indicators at a ratio according to an instruction made by the ratio instructing unit and display the resulting indicators on the display unit.

With this configuration, in the case where the indicators on the leak portion display image overlap one another, making it difficult to know the distribution of the indicators, it is possible to make it easy to know the distribution of the indicators by adjusting the size of the indicators.

According to an aspect, it is preferable that the management apparatus further includes an indicator selecting unit that selects an indicator to be displayed on the display unit from the indicators, and the data processing unit is configured to display, on the display unit, as detailed data on a fluid leak portion corresponding to an indicator selected from the indicators in accordance with a selection instruction made by the indicator selecting unit, at least one of a device at which a fluid leak has occurred and a site of the fluid leak in the device, an amount of fluid leakage at the fluid leak portion, a type of leaking fluid at the fluid leak portion, and a photographed image of the fluid leak portion such that the detailed data is displayed superimposed on the leak portion display image.

With this configuration, by using the detailed data on the fluid leak portions, it is possible to perform various analyses and the devising of a repair plan taking into account detailed information regarding each of the fluid leak portions, in addition to the trend of fluid leaks in the plant, which can be comprehended from the leak portion display image.

According to an aspect, it is preferable that the management apparatus further includes a storage unit in which the data input to the input unit is cumulatively stored, and the data processing unit is configured to generate the leak portion display image for each of a plurality of fluid leak diagnoses of the same plant cumulatively stored in the storage unit and to be capable of displaying, on the display unit, an image in which the leak portion display images generated respectively for the plurality of fluid leak diagnoses are arranged.

With this configuration, since the image in which the leak portion display images generated for the respective fluid leak diagnoses of the target plant from past to present are arranged is displayed, it is possible to comprehend changes in the distributions of fluid leak portions, types of leaking fluid, and amounts of fluid leakage in the target plant. Thus, it is possible to comprehend the chronological trend of fluid leaks in the plant, and it is possible to even more precisely comprehend the trend of fluid leaks in the target plant by also taking into account the chronological trend. Therefore, analyses based on the trend of fluid leaks in the plant, such as the devising of a maintenance plan future plant and the deduction of the extent of deterioration of the equipment and a defect, can be more accurately performed.

Moreover, it is possible to confirm the effect of continuously performing fluid leak diagnoses and repairs based on the results of the diagnoses, from the changes in fluid leaks in the target plant from past to present.

According to an aspect, it is preferable that the management apparatus further includes a storage unit in which the data input to the input unit is cumulatively stored, and the data processing unit is configured to generate the leak portion display image for each fluid leak diagnosis of each of a plurality of plants cumulatively stored in the storage unit and to be capable of displaying, on the display unit, an image in which the leak portion display images generated respectively for the plurality of plants are arranged.

With this configuration, since the image in which the leak portion display images generated respectively for the plurality of plants are arranged is displayed, it is possible to comprehend differences in fluid leaks (differences in distributions of fluid leak portions, types of leaking fluid, and amounts of fluid leakage) between the plants to be compared. Then, an analysis of the relationship of the differences in fluid leaks between the plants to be compared with differences in operating conditions (equipment configurations of the plants, operating times, amounts of various fluids used, and the like) between the plants to be compared makes it possible to deduce which difference in the operating conditions between the plants causes the difference in fluid leaks between the plants to be compared, that is, the cause of the differences in fluid leaks. Thus, it is possible to take measures against fluid leaks in the target plant.

According to an aspect, it is preferable that the data processing unit is configured to generate the leak portion display image based on data that is input to the input unit in the middle of a fluid leak diagnosis of the plant.

With this configuration, it is possible to know the trends in the distributions of fluid leak portions, types of leaking fluid, and amounts of fluid leakage within a region in which the fluid leak diagnosis has been performed. Thus, it is possible to evaluate whether the diagnosis plan that has been carried out in the diagnosed region is appropriate. Furthermore, it is possible to infer the trend of fluid leaks in the undiagnosed region from the trend of fluid leaks in the region in which the fluid leak diagnosis has been performed, and thus, based on the inferred trend of fluid leaks in the undiagnosed region, it is possible to change the plan for the fluid leak diagnosis of the undiagnosed region to an effective plan tailored to the trend of fluid leaks. For example, in the case where it is deduced that there is a possibility that fluid leaks are occurring in clusters in a region that was not originally scheduled to be diagnosed, the diagnosis plan is changed so that this region will be diagnosed.

According to an aspect, it is preferable that the data processing unit is configured to display the leak portion display image such that a diagnosed region that has been diagnosed in the fluid leak diagnosis of the plant and an undiagnosed region are differentiated from each other.

With this configuration, it is possible to clearly comprehend which region of the leak portion display image has already been diagnosed. For example, it is possible to clearly comprehend whether a region in which no indicators are displayed on the leak portion display image is a region in which diagnosis has already been finished, but no fluid leak portions have been found, or is simply an undiagnosed region. Therefore, it is possible to even more precisely evaluate whether the diagnosis plan that has been carried out in the diagnosed region is appropriate, and it is possible to even more precisely infer the trend of fluid leaks in the undiagnosed region. Thus, the plan for the fluid leak diagnosis of the undiagnosed region can be changed to an even more effective plan.

A fluid leak portion management system according to the present disclosure is a fluid leak portion management system including:

the management apparatus according to any aspect of the present disclosure; and a portable leakage detecting device used for a fluid leak diagnosis of the plant, wherein data on the fluid leak portions collected by the leakage detecting device is input to the input unit of the management apparatus from the leakage detecting device, the leakage detecting device is configured such that detected positional data can be input to the leakage detecting device, the detected positional data indicating positions, in the plant, of respective fluid leak portions that have been detected, and the data processing unit is configured to use the detected positional data input to the input unit as the positional data, and dispose the indicators on the leak portion display image at locations corresponding to the detected positional data on the configuration diagram image.

With this configuration, since the data on fluid leak portions is input to the management apparatus by the leakage detecting device, the complicated job of manually inputting individual pieces of data on fluid leak portions one by one is eliminated, and thus, the data can be easily input to the management apparatus. Furthermore, since the indicators are displayed on the leak portion display image such that the indicators are disposed at locations corresponding to the detected positional data, if detected positional data indicating the position of a detected leak portion is input to the leakage detecting device upon detection of that fluid leak portion during the fluid leak diagnosis, an indicator can automatically be disposed at the position of the fluid leak portion on the leak portion display image with only a data input operation from the leakage detecting device to the management apparatus without complicated work being involved.

An indicator can be disposed at a position corresponding to the detected positional data on the leak portion display image by appropriate means. For example, the data processing unit may convert the detected positional data input to the input unit into coordinate values on the configuration diagram image, and the location indicated by the converted coordinate values may be used as the location of the indicator on the leak portion display image. Alternatively, the leakage detecting device may convert the detected positional data into coordinate values on the configuration diagram image and input the detected positional data converted into the coordinate values to the management apparatus, and the location indicated by the coordinate values may be used as the location of the indicator on the leak portion display image.

According to an aspect, it is preferable that the leakage detecting device includes a display, and in a state in which an image indicating a diagnosis area is displayed on the display, when a mark indicating a position of a fluid leak portion in the diagnosis area is added to the displayed image in accordance with a manual position indicating operation, the position indicated by the mark on the displayed image is used as the detected positional data, and the detected positional data is input to the leakage detecting device.

With this configuration, since the detected positional data indicating the position of a fluid leak portion is input while referring to an image indicating a diagnosis area through a so-called marking operation, the detected positional data can be precisely and easily input to the leakage detecting device.

BRIEF DESCRIPTION OF THE DRAWINGS

FIG. 4 shows a rear end of a mobile detector in an enlarged manner.
FIG. 5 shows a front end of the mobile detector in an enlarged manner.
FIG. 13 shows a list image.
FIG. 16 shows a repair schedule.
FIG. 18 shows a diagnosis report.

EMBODIMENT

Figure 1:
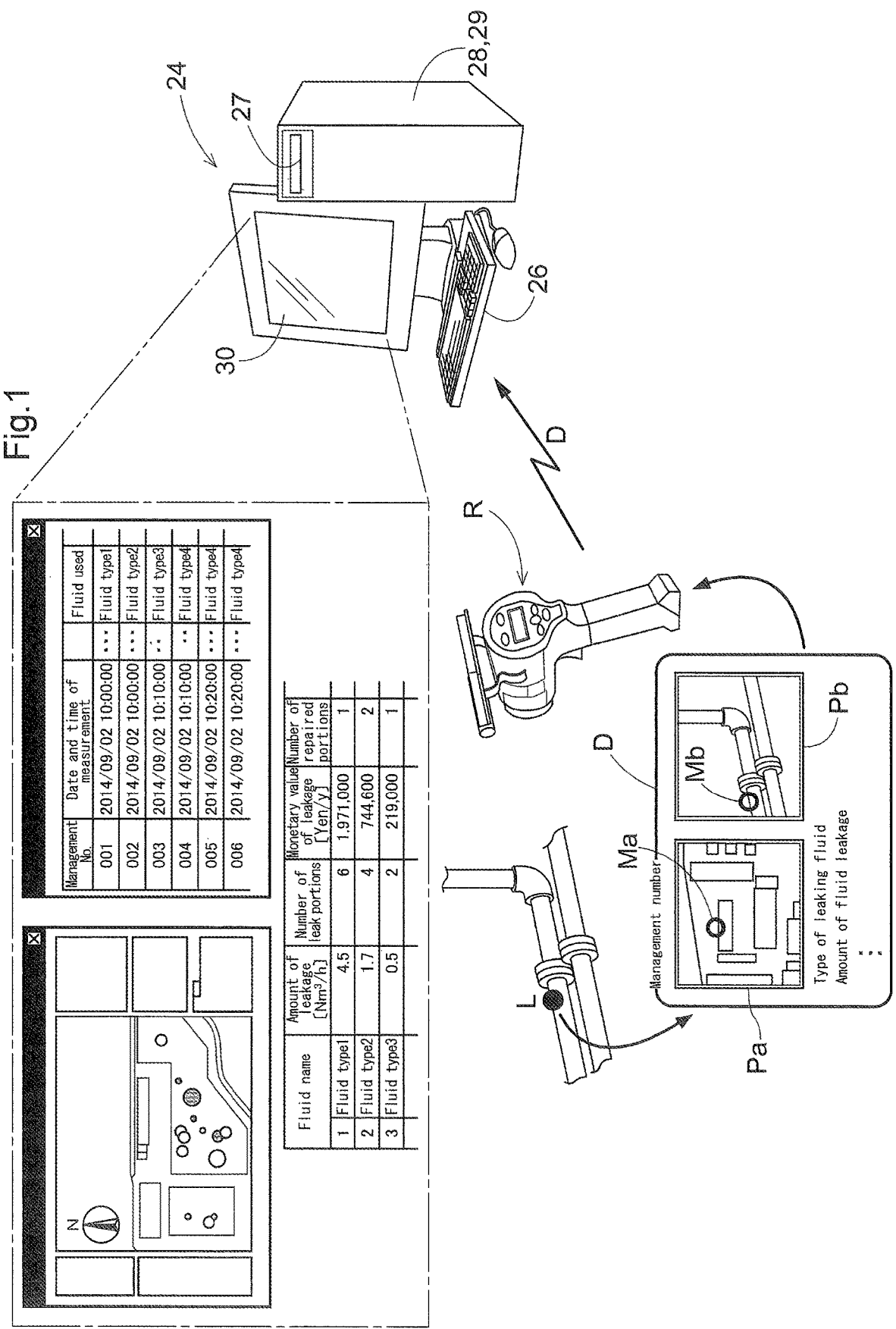
FIG. 1 schematically shows a management system according to the present disclosure.

The present disclosure relates to a management apparatus that manages data on fluid leak portions collected through a fluid leak diagnosis of a plant and a management system constituted by the management apparatus and a leakage detecting device that is used for the fluid leak diagnosis. FIG. 1 schematically shows the present disclosure. According to the present disclosure, a fluid leak diagnosis of a plant is performed using a portable leakage detecting device R, and collected data is input to a host computer 24 serving as the management apparatus.

As the fluid leak diagnosis, a fluid leak from each of the various portions of a piping system and a vessel system of a plant is diagnosed using the leakage detecting device R. If a fluid leak is detected by the leakage detecting device R (reference numeral L in FIG. 1), various kinds of information (type of leaking fluid, date and time of detection, device in which a fluid leak portion has developed, etc.) are input to the leakage detecting device R, a computation of the amount of fluid leakage at that portion is instructed, the fluid leak portion is photographed, and the fluid leak portion is marked on an area map image Pa of a diagnosis area and a photographed image Pb. Thus, collected data D is produced in which the above-described input information, the computed amount of fluid leakage, the photographed image Pb, and the positions indicated on the area map image Pa and the photographed image Pb are associated with a management number given to that leak portion. That is to say, the collected data D is a collective set of data including the state of the fluid leak (amount of fluid leakage, type of leaking fluid, device in which the leak has occurred, etc.) and the specific position of the fluid leak (the photographed image Pb, the marking positions on the area map image Pa, and the photographed image Pb, etc.). Diagnoses of various portions are sequentially performed, and each time a fluid leak is detected, collected data D for each fluid leak portion is produced. The collected data D is accumulated and stored.

After a predetermined diagnostic process has been completed, the accumulated collected data D is input to the host computer 24. Although described in detail later, the host computer 24, based on the input collected data D, not only simply uses the collected data D to identify the fluid leak portions, but also provides information regarding the economic effect that is to be obtained by repairing the fluid leak portions, the devising of a plan for repair of the fluid leak portions that have been found and a plan for future maintenance, and the improvement of the equipment of the plant. That is to say, according to the present disclosure, a method for effectively using the collected data collected through a fluid leak diagnosis of a plant can be provided.

Hereinafter, the present disclosure will be specifically described. First, the configuration of the leakage detecting device used for fluid leak diagnosis will be described. Subsequently, a method for performing a fluid leak diagnosis of a plant and collecting data on fluid leak portions using the leakage detecting device will be described. After that, management of the collected data using the management apparatus (host computer 24 in the description below) will be described.

Configuration of Leakage Detecting Device

Figure 2:
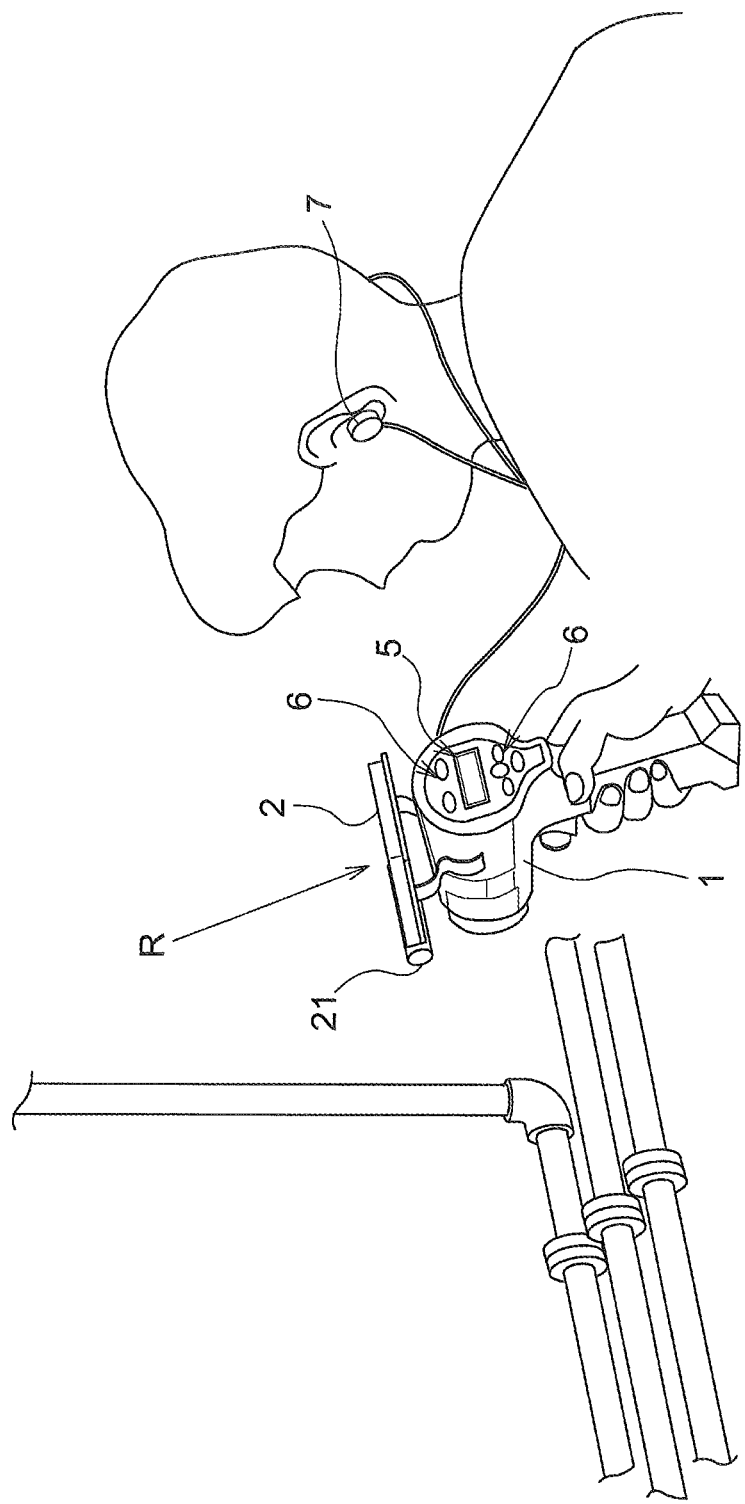
FIG. 2 shows a manner in which a leak portion is detected.
Figure 3:
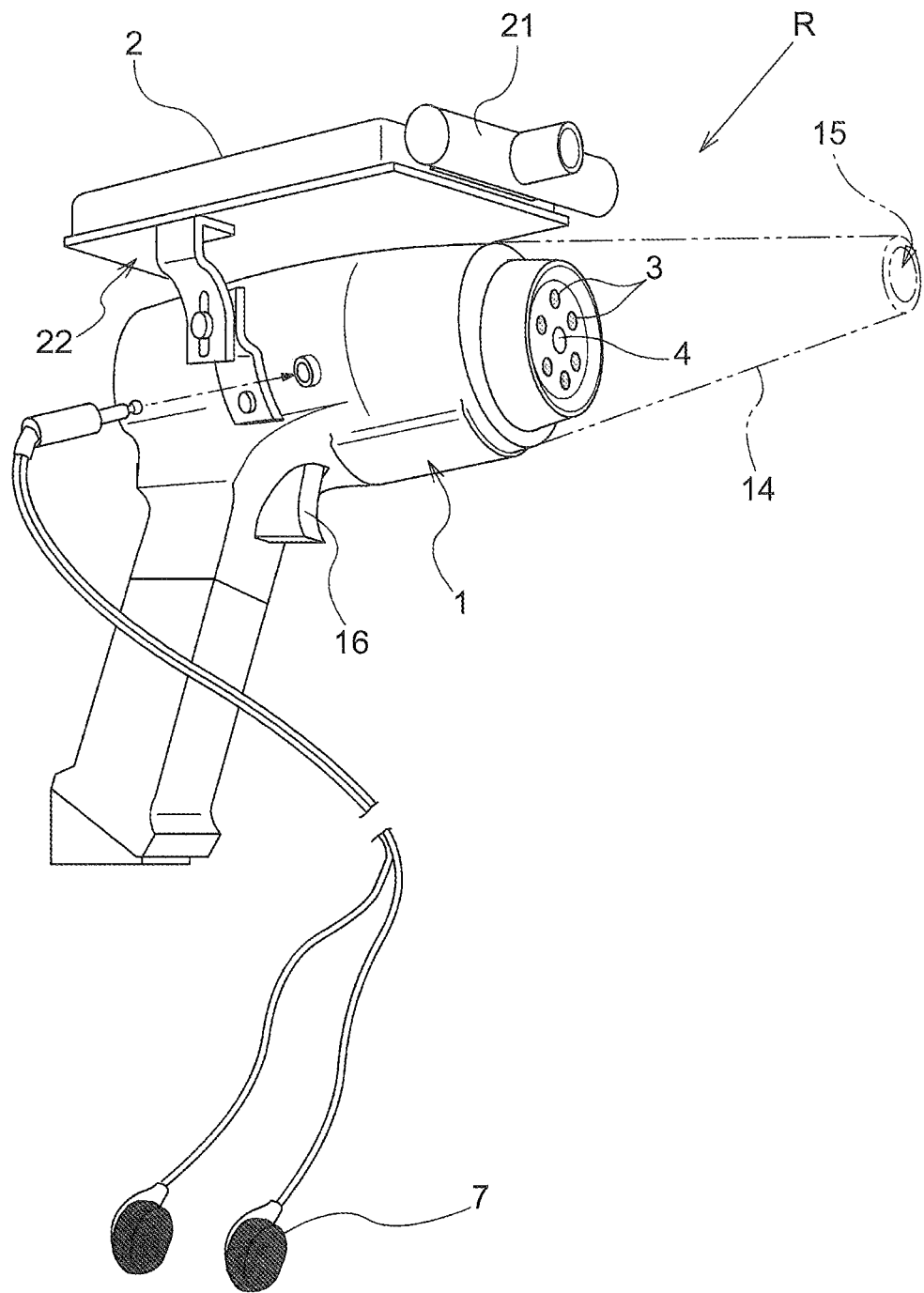
FIG. 3 is a perspective view of a leakage detecting device.

As shown in FIGS. 2 and 3, the leakage detecting device R includes a gun-shaped mobile detector 1 serving as a main device, and a mobile computer 2 attached to the mobile detector 1.

As shown in FIGS. 3 and 4, directional microphones 3 for detecting ultrasonic waves generated at a fluid leak portion and a light source 4 for emitting a light beam are arranged on a front end portion of the mobile detector 1, and a display unit 5 for displaying detected ultrasonic wave values (specifically, detected sound pressures) in bar-graphic representation and digital representation as well as various keys 6 are arranged on a rear end portion of the mobile detector 1. Moreover, an earphone 7 for outputting detection sounds obtained by making the detected ultrasonic waves audible is connected to the mobile detector 1.

Figure 11:
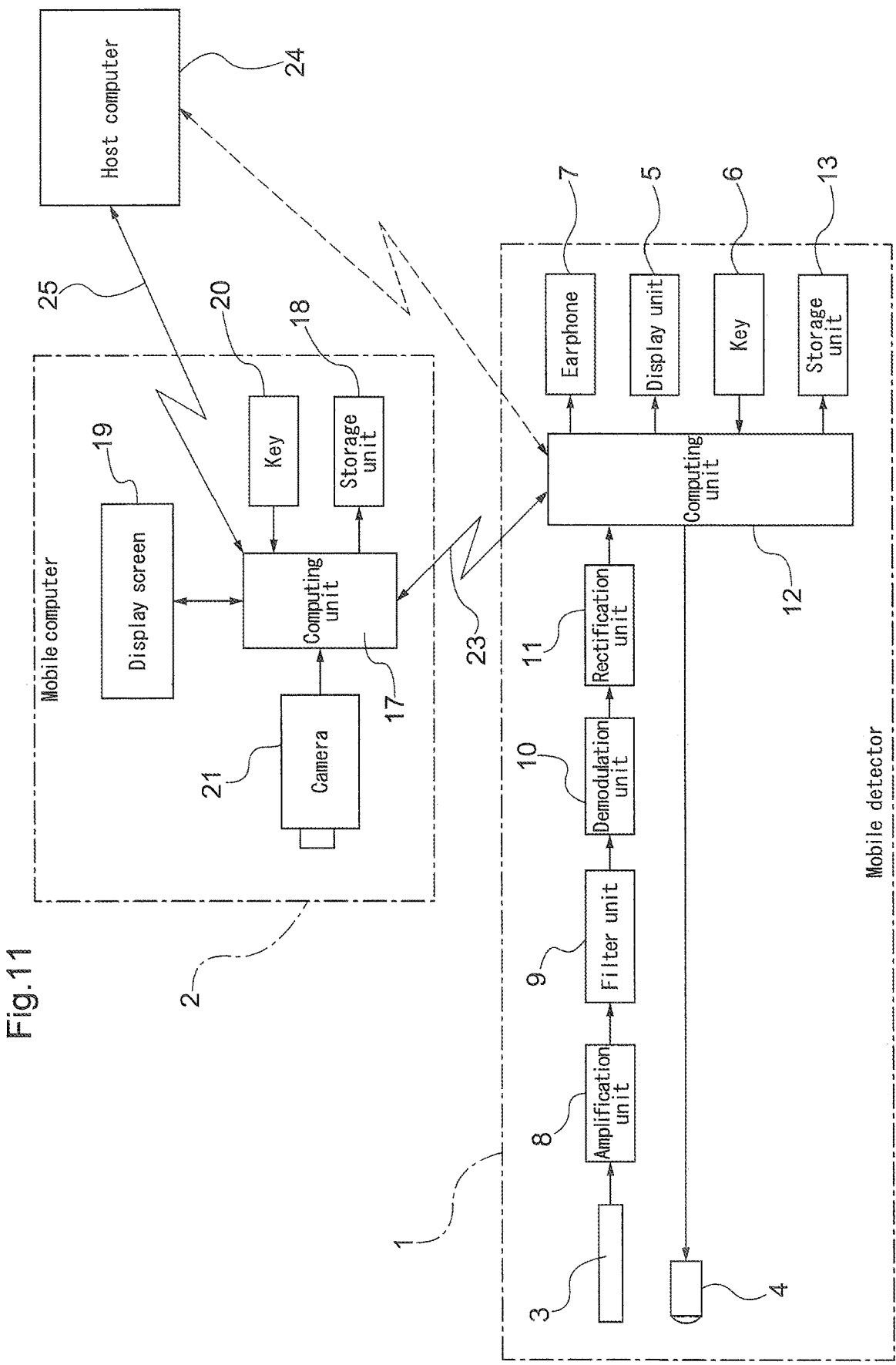
FIG. 11 is a block diagram of the leakage detecting device.

As shown in FIG. 11, the mobile detector 1 is equipped with a computing unit 12 to which signals output from the microphones 3 are input via an amplification unit 8, a filter unit 9, a demodulation unit 10, and a rectification unit 11 and which in turn causes the display unit 5 to display detected ultrasonic wave values based on the input signals and also causes the earphone 7 to output detection sounds obtained by making the detected ultrasonic waves audible, as well as a storage unit 13 for storing various kinds of data.

As shown in FIG. 5, the plurality of microphones 3 are arranged oriented in the same direction while being dispersed at the vertex positions of a regular polygon K (regular hexagon in the present example) in a state in which their directional ranges S have common overlapping portions SS. On the other hand, the light source 4 for emitting a light beam is disposed at the center of gravity of the regular polygon K as viewed in the directivity direction of the microphones such that the light beam is emitted to the common overlapping portions SS of the directional ranges S of the microphones. Thus, as shown in FIG. 2, in detecting a leak portion based on detected ultrasonic wave values and detection sounds while changing the directivity direction of the microphones 3 by changing the orientation of the front end of the mobile detector 1, the detection of a leak portion can be performed while visually observing light beam irradiation points and visually checking detection target portions in a clear manner at the thus respectively irradiated points one after another.

Changing the settings of ultrasonic wave detecting sensitivity (i.e., the degree of signal amplification in the amplification unit 8) can be performed by operating the keys 6. The sensitivity that is set is displayed on the display unit 5 together with the detected ultrasonic wave values. When a leak portion is detected, the keys 6 are operated to cause the computing unit 12 to associate an ultrasonic wave value detected at that leak portion, which is the output data from the microphones at that leak portion, with the sensitivity that is set at that time by using a management number given to that leak portion and to store the detected ultrasonic wave value in the storage unit 13 together with the set sensitivity.

Reference numeral 14 denotes a conical cap having a small opening 15 at a front end thereof. When a possible leak portion is detected, the cap 14 is fitted to the front end portion of the mobile detector 1, if necessary, to enhance the directivity of the plurality of microphones 3 as a whole, and in this state, the detector is moved closer to the leak portion to check the leak portion based on the ultrasonic wave value and detection sound at that time.

Reference numeral 16 denotes a power switch that can be operated in the same manner as a trigger. When the power switch 16 is turned ON, the detector is brought into an ultrasonic wave detection state. It should be noted that light beam emission is switched ON/OFF by operating the keys 6.

As shown in FIGS. 1 and 11, the mobile computer 2 includes a computing unit 17, a storage unit 18, a display 19, and various keys 20, and a small-sized digital camera 21 can be mounted to the mobile computer 2. The mobile computer 2 can be detachably attached to an upper portion of the mobile detector 1 through an attaching element 22 such that the position of the mobile computer 2 is adjustable, and can also communicate with the mobile detector 1 via a wired or wireless communication unit 23.

Fluid Leak Diagnosis

To perform a fluid leak diagnosis, first, an area map image Pa (image such as that shown in FIG. 10) of a diagnosis area in a plant to be diagnosed is stored in the storage unit 18 of the mobile computer 2. After that, while a diagnosis staff moves around the diagnosis area, leak portions are diagnosed based on detected ultrasonic wave values and detection sounds using the mobile detector 1 as shown in FIG. 2. If a leak portion is found, the ultrasonic wave value detected at that leak portion is stored in the storage unit 13 of the mobile detector 1 by operating the keys 6 as described above.

Figure 6:
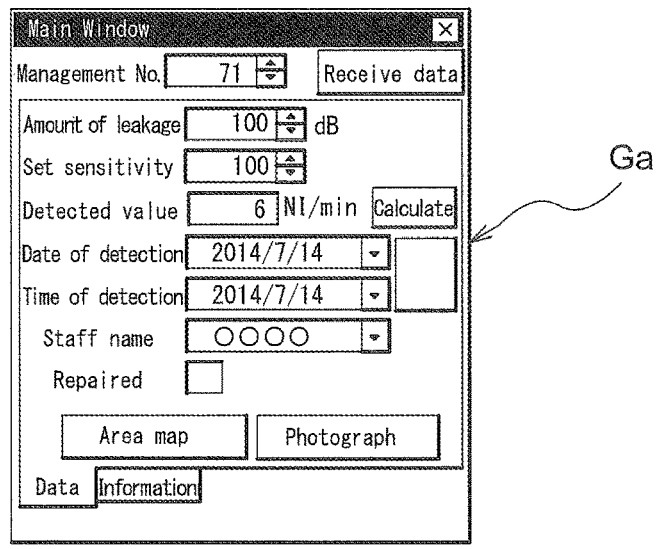
FIG. 6 shows a data input screen.

After this storing operation has been performed, the computing unit 12 of the mobile detector 1 calls the computing unit 17 of the mobile computer 2. In response to this, the computing unit 17 of the mobile computer 2 reads the detected ultrasonic wave value and the set sensitivity that have been associated with each other by using the management number and stored in the storage unit 13 of the mobile detector 1, and displays a data input screen Ga such as that shown in FIG. 6 on the display 19. In the data input screen Ga, with respect to that leak portion, the management number, the detected ultrasonic wave value, the set sensitivity, the date and time of detection, the name (or ID) of the diagnosis staff, and a checkbox indicating whether repair has been finished are displayed.

Figure 8:
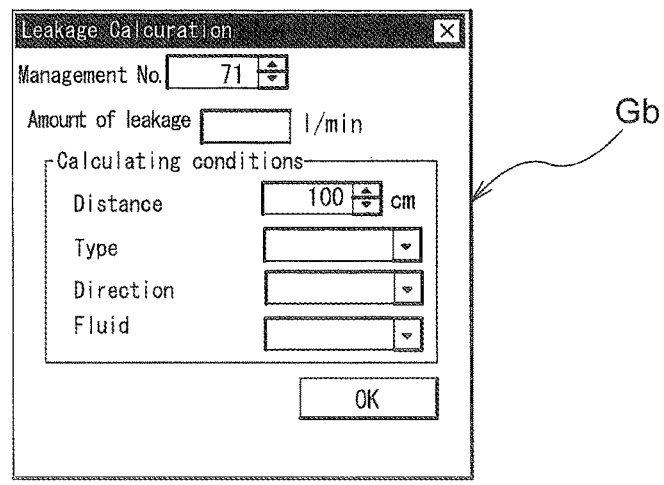
FIG. 8 shows a computing condition input screen.

Moreover, when an instruction to compute the amount of leakage is given through a key operation in the data input screen Ga, the computing unit 17 displays a computing condition input screen Gb such as that shown in FIG. 8 on the display 19. When computing conditions for that leak portion with respect to various items, namely, distance, type, direction, and fluid are input in the computing condition input screen Gb, the computing unit 17 calculates the amount of fluid leakage at that leak portion based on the detected ultrasonic wave value at that leak portion and the input computing conditions, and displays the calculated amount of leakage in the computing condition input screen Gb.

It should be noted that with regard to the above-described items, distance means the distance between a leak point and the detector 1, type means the type of a piping member or the like that leaks, direction means the direction in which ultrasonic waves are detected relative to the leak point, and fluid means the type of leaking fluid.

During input of the conditions in the computing condition input screen Gb, with respect to the items, type, direction, and fluid, when display of a list is instructed through a key operation in the screen Gb, the computing unit 17 displays, for each of the items, a list (pulldown menu) of computing condition data in the screen Gb. When the computing condition data corresponding to the relevant leak portion is selected from the list, the computing unit 17 executes the above-described calculation using the selected data as an input computing condition.

Before a series of detecting operations are performed, the computing condition data in each list has been produced by the host computer 24 using a dedicated program, transmitted from the host computer 24 to the mobile computer 2 via a wired or wireless communication unit 25 as shown in FIG. 1, and stored in the storage unit 18 of the mobile computer 2. The computing condition data can be rewritten through the same operation whenever necessary depending on the target diagnosis area, the type of leak portions to be detected, and the like.

The function of computing the amount of leakage is also provided in the mobile detector 1 so that the amount of leakage can be computed even in the case where the mobile computer 2 is removed from the mobile detector 1 and the detection of leak portions is performed using the mobile detector 1 alone. In storing a detected ultrasonic wave value in the storage unit 13 of the mobile detector 1, the computing conditions with respect to the various items are input by operating the keys 6 while confirming the input data on the display unit 5. Then, the computing unit 12 of the mobile detector 1 calculates the amount of fluid leakage based on the detected ultrasonic wave value and the input computing conditions, displays the calculated amount of leakage on the display unit 5. Also, the computing unit 12 associates the calculated amount of leakage, the detected ultrasonic wave value, and the set sensitivity with one another by using the management number given to the relevant leak portion, and stores them in the storage unit 13.

It should be noted that in the case where the amount of leakage is computed on the mobile detector 1 side as described above with the mobile computer 2 being mounted to the mobile detector 1, the computing unit 17 of the mobile computer 2 when reading the detected ultrasonic wave value and the set sensitivity stored in the storage unit 13 of the mobile detector 1 also reads the calculated amount of leakage from the storage unit 13 of the mobile detector 1. Then, the amount of leakage that has been computed on the mobile computer 2 side or the mobile detector 1 side is displayed in the data input screen Ga together with the management number, the detected ultrasonic wave value, the set sensitivity, the date and time of detection, the name of the diagnosis staff, and the checkbox indicating whether repair has been finished with respect to that leak portion.

Figure 7:
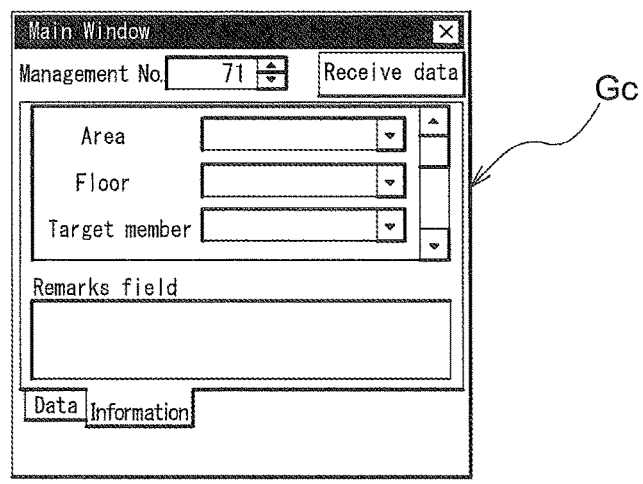
FIG. 7 shows a positional information input screen.

In the data input screen Ga, when an instruction to display a positional information input screen is given through a key operation in the screen Ga, the computing unit 17 displays a positional information input screen Gc such as that shown in FIG. 7 on the display 19. In the positional information input screen Gc, positional information of that leak portion is input with respect to the following items: area, floor, target member, target site, and type of fluid used (it should be noted that the target site and the type of fluid used are hidden in FIG. 7, and input to each of these items, the target site and the type of fluid used, is performed after the item has been displayed by operating a scroll bar). Moreover, during input of information in the positional information input screen Gc, when an instruction to display a list is given through a key operation on the screen Gc with respect to each of the items, namely, area, floor, target member, target site, and type of fluid used, the computing unit 17 displays a list (pulldown menu) of positional data in the screen Gc for each item individually. When the positional data corresponding to the relevant leak portion is selected from the list, the computing unit 17 uses the selected data as input positional information with respect to that leak portion.

In should be noted that, with regard to the above-described items, the area means the name of the area in which diagnosis is performed, the floor means the floor number of the diagnosis area in the plant, the target member means the type of a device (pipe, valve, or the like) that leaks the fluid, the target site means the site (main body portion, joint portion, flange portion, or the like) of the target member where the leak has occurred, and the type of fluid used means the type of the fluid that is used in the target member.

As in the case of the above-described computing condition data, the positional data in each list and the item names of the items, area, floor, target member, and target site have been produced by the host computer 24 using a dedicated program and stored in the storage unit 18 of the mobile computer 2 before the series of detecting operations are performed, and can be rewritten whenever necessary depending on the target diagnosis area, the type of leak portions to be detected, and the like.

Moreover, a remarks field is provided in a lower portion of the positional information input screen Gc so as to enable input of detailed place information ("north side·main line·valve", for example) indicating a specific place within an area.

Figure 10:
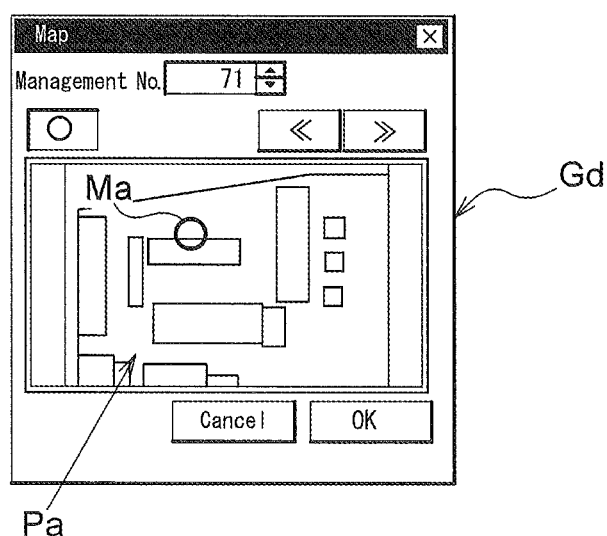
FIG. 10 shows an area map screen.

Furthermore, when an instruction to display an area map in the data input screen Ga is given through a key operation in the screen Ga, the computing unit 17 displays an area map screen Gd such as that shown in FIG. 10 on the display 19 and displays the area map image Pa stored in the storage unit 18 in the area map screen Gd. Then, when a marking operation (corresponding to a manual position-indicating operation) for indicating the position of the leak portion on the displayed area map image Pa (i.e., position of the leak portion in the diagnosis area) is performed in accordance with a predetermined operation procedure, the computing unit 17 displays a mark Ma (in the present example, a circle centered on the indicated position) in the area map image Pa as shown in FIG. 10, the mark Ma indicating the position of the leak portion.

Figure 9:
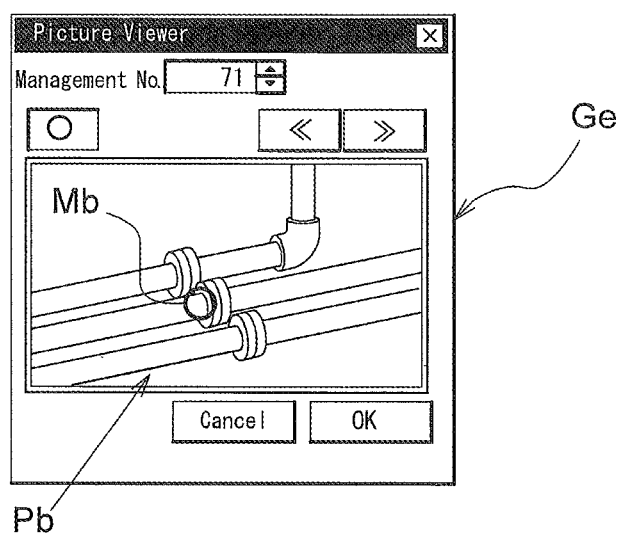
FIG. 9 shows a photographed image screen.

Similarly, after the leak portion has been photographed using the camera 21 mounted to the mobile computer 2, when an instruction to display a photographed image in the data input screen Ga is given through a key operation in the screen Ga, the computing unit 17 displays a photographed image screen Ge such as that shown in FIG. 9 on the display 19 and displays a photographed image Pb of the leak portion in the photographed image screen Ge. Then, when a marking operation for indicating a detailed position of the leak on the photographed image Pb is performed in accordance with a predetermined operation procedure, the computing unit 17 displays a mark Mb (in the present example, a circle centered on the indicated position) in the displayed photographed image Pb as shown in FIG. 9, the mark Mb indicating the detailed position of the leak. It should be noted that, although not shown in the drawings, in addition to the image such as that shown in FIG. 9, which is obtained by photographing the leak position while zooming in on the leak position, an image obtained by zooming out so as to also show the equipment around the leak position may also be photographed as the photographed image Pb, if necessary, and the same marking operation may be performed on the zoomed-out image as well.

Moreover, there are cases where the detection of a leak portion and the repair of the leak portion are performed simultaneously, and if repair is performed simultaneously, the checkbox indicating whether repair has been finished is checked through a key operation on the data input screen Ga.

Then, when input in the above-described screens Ga to Ge is completed, the computing unit 17 associates with one another, with respect to the leak portion, the detected ultrasonic wave value, the set sensitivity, the amount of leakage, the date and time of detection, the name of the diagnosis staff, the input positional information (area, floor, target member, target site, type of fluid used, detailed place information entered in the remarks field), the input computing conditions (distance, type, direction, fluid), the position indicated by the mark Ma in the displayed area map image Pa, the photographed image Pb, the position indicated by the mark Mb in the displayed photographed image Pb of the leak portion, and whether or not the checkbox indicating whether repair has been finished is checked, by using the management number given to that leak portion, and stores them in the storage unit 18 as the collected data D. The position indicated by the mark Ma in the displayed area map image Pa is converted to coordinate values in the area map image Pa, and the coordinate values are stored in the storage unit 18. Similarly, the position indicated by the mark Mb in the photographed image Pb is also stored in the storage unit 18 as coordinate values in the photographed image Pb.

That is to say, while moving around the diagnosis area and sequentially detecting leak portions, the diagnosis staff performs the above-described processing operations for each of the leak portions. As a result, the collected data D (the detected ultrasonic wave value, the set sensitivity, the amount of leakage, the date and time of detection, the name of the diagnosis staff, the input positional information, the input computing conditions, the position indicated by the mark Ma, the photographed image Pb, the position indicated by the mark Mb, whether or not the checkbox indicating whether repair has been finished is checked with respect to the same leak portion, which are associated with one another by using the management number given to that leak portion) on each of the leak portions is accumulated in the storage unit 18 of the mobile computer 2.

After a series of diagnosing operations has been completed, as in the case of writing of the computing condition data and the positional data, the collected data D stored in the storage unit 18 of the mobile computer 2 is input to the host computer 24 via the wired or wireless communication unit 25, as shown in FIG. 1.

It should be noted that the mobile detector 1 is also enabled to perform wired or wireless communication with the host computer 24 for cases where the mobile detector 1 is used alone, and the collected data D stored in the storage unit 13 of the mobile detector 1 can be input to the host computer 24, or various kinds of data can be directly written to the storage unit 13 of the mobile detector 1 from the host computer 24.

Moreover, when management IDs are assigned to devices in the plant including pipes, the management IDs may each be associated with the area, floor, target member, type of fluid used, and detailed place information of the plant in advance, and the resulting correspondence table is stored in the storage unit 18, so that simply inputting a management ID as the positional information to be input in the positional information input screen Gc causes the computing unit 17 to convert the management ID into the corresponding area, floor, target member, type of fluid used, and detailed place information, the converted positional information is stored in the storage unit 18 in a state in which the positional information is associated with the management number given to the leak portion. Furthermore, the management IDs may each be associated with coordinate values in the area map image Pa, and the resulting correspondence table may be stored in the storage unit 18 in advance, so that inputting a management ID causes the computing unit 17 to convert the management ID into the corresponding coordinate values in the area map image Pa, and the coordinate values of the mark Ma is stored in the storage unit 18 in a state in which they are associated with the management number given to the leak portion, without performing the marking operation on the area map image Pa. It should be noted that conversion of a management ID into positional information or coordinate values of the mark Ma may also be performed by a database management unit 32, which will be described later.

Instead of the area map image Pa, a configuration diagram image of the plant may also be stored in the storage unit 18. In this case, a marking operation for indicating the position of the leak portion on the configuration diagram image is performed, the mark Ma indicating the position of the leak portion is displayed on the configuration diagram image, and furthermore, the coordinate values of the mark Ma on the configuration diagram image are stored in the storage unit 18 in a state in which the coordinate values are associated with the management number given to the leak portion.

Management of Collected Data

As shown in FIG. 1, the host computer (corresponding to the management apparatus) 24 includes an operation unit 26 (corresponding to a leaking fluid type selecting unit, a scaling instructing unit, a ratio instructing unit, and an indicator selecting unit) constituted by a keyboard and a mouse; an input unit 27 constituted by a dedicated terminal for the mobile computer 2 or the mobile detector 1, wireless communication means such as infrared communication equipment, a CD drive, and the like; a storage unit 28 constituted by a hard disk, a computing unit (corresponding to a data processing unit) 29 constituted by an internal CPU, and a display unit 30 constituted by a display. A management program and a database Db are stored in the storage unit 28. The host computer 24 performs operations, such as processing of input data, as per the computing unit 29 executing the management program.

Figure 12:
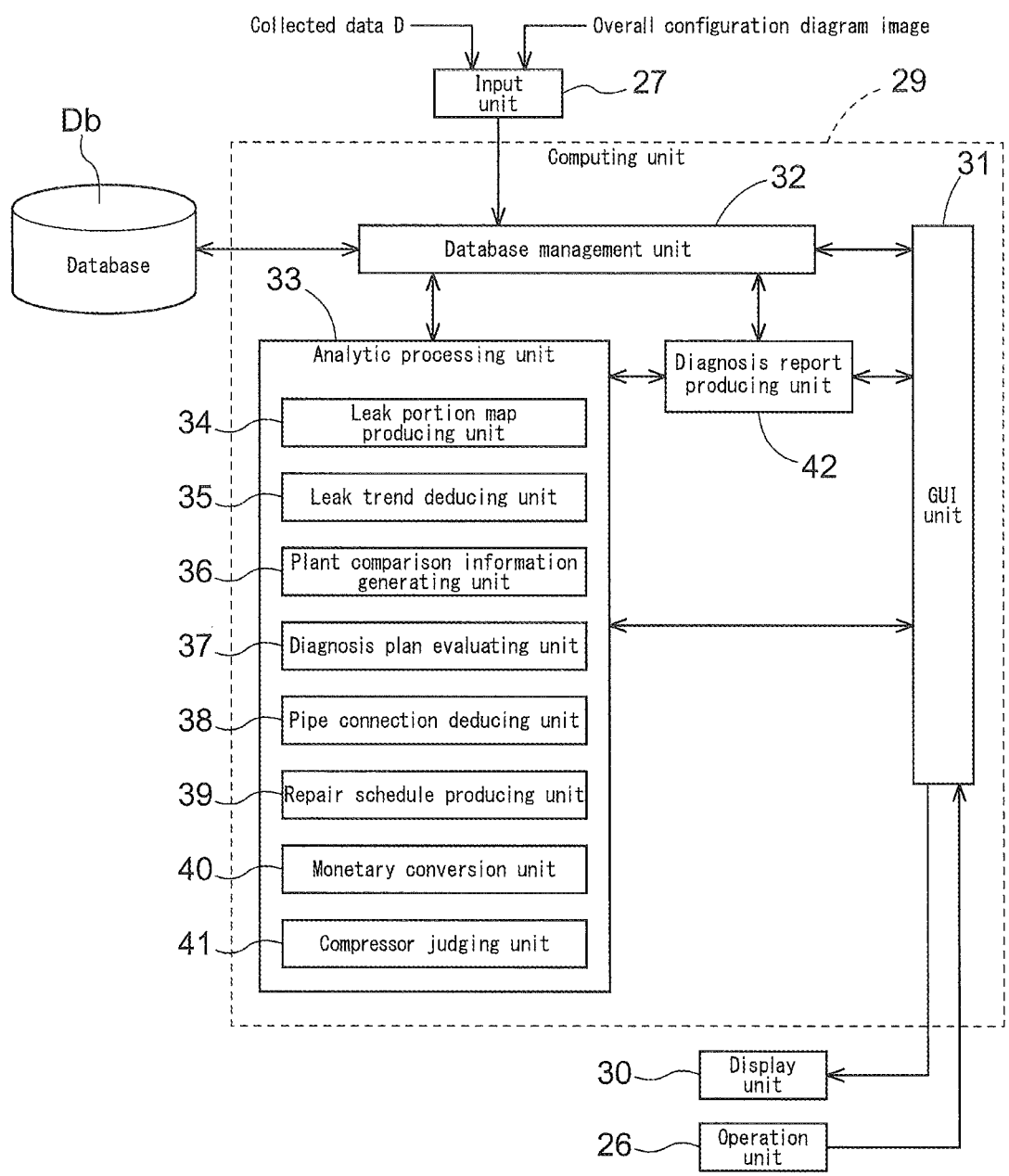
FIG. 12 is a block diagram of a management apparatus.

The collected data D (collected data D stored in the storage unit 18 of the mobile computer 2 or the storage unit 13 of the mobile detector 1) on individual fluid leak portions that has been collected through a fluid leak diagnosis of a plant is input to the host computer 24 by the input unit 27. The input collected data D is cumulatively recorded in the database Db as described later, In order to receive an input of an instruction through a simple operation of the operation unit 26 via the display unit 30, the host computer 24 includes a GUI unit 31 that realizes a graphic user interface, as shown in FIG. 12. The GUI unit 31 cooperates with various functional units, namely, the database management unit 32, an analytic processing unit 33, and a diagnosis report producing unit 42. Moreover, the analytic processing unit 33 is constituted by the following functional units: a leak portion map producing unit 34, a leak trend deducing unit 35, plant comparison information generating unit 36, a diagnosis plan evaluating unit 37, a pipe connection deducing unit 38, a repair schedule producing unit 39, a monetary conversion unit 40, and a compressor judging unit 41. Thus, the host computer 24 performs operations corresponding to the various functional units in accordance with instructions from the operation unit 26. The following is a description of the various functional units.

Database Management Unit 32

The database management unit 32 performs management of the database Db and display of data recorded in the database Db. The database management unit 32 has the database recording function of reading the collected data D from the input unit 27 and cumulatively recording the read data in the database Db, and also reading an overall configuration diagram image (or a partial configuration diagram image, the same applies below) of a plant to be subjected to a fluid leak diagnosis from the input unit 27 and recording the read image in the database Db. Moreover, in the case where management IDs are assigned to devices in the plant including pipes, the management IDs may each be associated with an area in the plant, floor, target member, type of fluid used, and pieces of detailed place information, and the resulting correspondence table may be stored in the storage unit 28 in advance. Then, the management IDs may each be converted into the corresponding area, floor, target member, type of fluid used, and detailed place information, and the converted positional information may be recorded in the database Db. Furthermore, the management IDs may each be associated with coordinate values in the area map image Pa, and the resulting correspondence table may be stored in the storage unit 28 in advance. Then, the management IDs may each be converted into the corresponding coordinate values in the area map image Pa, and the coordinate values may be recorded in the database Db.

Furthermore, the database management unit 32 has the database displaying function of displaying a list image Pc on the display unit 30 as shown in FIG. 13, the list image Pc showing data such as the collected data D recorded in the database Db in a table format. Moreover, the database management unit 32 has the database editing function of being able to edit data in the list on the list image Pc by, for example, rewriting the data or writing data to the data through an operation of the operation unit 26. In the case where the data is edited, the database Db is updated in accordance with the edit. In the list image Pc, data on a desired fluid leak portion can be displayed by scrolling through the list using the operation unit 26. Moreover, the database management unit 32 has the filtering function (see the fields of area, floor, and diagnosis staff in an upper portion of FIG. 13), so that only fluid leak portions that satisfy a specific condition can be displayed. For example, only data on fluid leak portions within a designated area can be displayed, or only data on fluid leak portions diagnosed by specified diagnosis staff can be displayed.

The database management unit 32 makes it possible to look at all data on all of the fluid leak portions and to display only the required data. Thus, data management is easy. Moreover, any error in the collected data D can be easily corrected through data editing.

In the database management unit 32, it is possible to input and edit the annual operating time of the plant, the unit price of each fluid used, and a check mark indicating whether to lock the operating time and the unit price, which are required for the computation in the monetary conversion unit 40. For example, as the database editing function, a collective entry field (not shown) of the annual operating time of the plant and a collective entry field (not shown) of the unit price of a fluid used are provided for each combination of the type of fluid used and the area in the plant, and by inputting the annual operating time of the plant and the unit price of the fluid used into the respective collective entry fields, it is possible to collectively input the input operating time and unit price of the fluid used into the fields of the operating time and the fields of the unit price of the fluid used, respectively, of target fluid leak portions. Moreover, values can also be directly input, respectively, into the field of the operating time and the field of the unit price of the fluid used with respect to each of the fluid leak portions shown in the list image Pc, and thus, editing can be performed for each fluid leak portion individually. It should be noted that the database Db is updated in accordance with the input contents. When a checkbox indicating whether to lock the operating time and the unit price is checked, even if a new operating time or unit price is input into the collective entry field (not shown) of the annual operating time of the plant or the collective entry field of the unit price of the fluid used, the value input into that collective entry field is not input into the field for a leak portion with respect to which the checkbox is checked, and the originally input value in that field is fixed.

In this manner, the annual operating time of the plant and the unit price of each fluid used can be collectively entered, and this makes it possible to easily change computing conditions used in the monetary conversion unit 39, which will be described later. Moreover, the checkboxes indicating whether to lock the operating time and the unit price are provided, making it possible for a value to remain fixed even if an operating time and a unit price is collectively entered. Thus, cases where a fluid leak portion for which the operating time or the unit price of the fluid used is set at a value different from that for other portions is included can also be dealt with. Examples of such cases include a case where a fluid leak portion is located in a place where the operation is performed within only a specific period of time while the plant is in operation, and a case where a fluid leak portion is located in a special environment, and therefore the unit price of the fluid used at that portion is higher than the unit price of the same type of fluid used at another portion.

It should be noted that the collective entry field of the annual operating time of the plant is also provided only for each type of fluid used or for each area in the plant, and the collective entry field of the unit price of the fluid used is also provided only for each type of fluid used. Moreover, the input operating time and unit price and the check mark in the checkbox indicating whether to lock the operating time and the unit price are recorded in the database Db.

The database management unit 32 has the function of displaying detailed data, and when an item in the list image Pc is selected through the operation unit 26, the database management unit 32 accesses the database Db to extract data, and displays a detailed data image Pd regarding a fluid leak portion corresponding to the selected item such that the detailed data image Pd is superimposed on the list image Pc. More specifically, as shown in FIG. 14, the host computer 24 displays, as the detailed data image Pd, an image Pd1 showing fluid leak information, positional information, photographed images Pb, and the like of the selected fluid leak portion, an arrangement plan image Pd2 showing the position of the selected fluid leak portion on the overall configuration diagram of the plant, and a supplementary information image Pd3 showing supplementary information, which are switched through an operation of the operation unit 26.

Figure 14A:
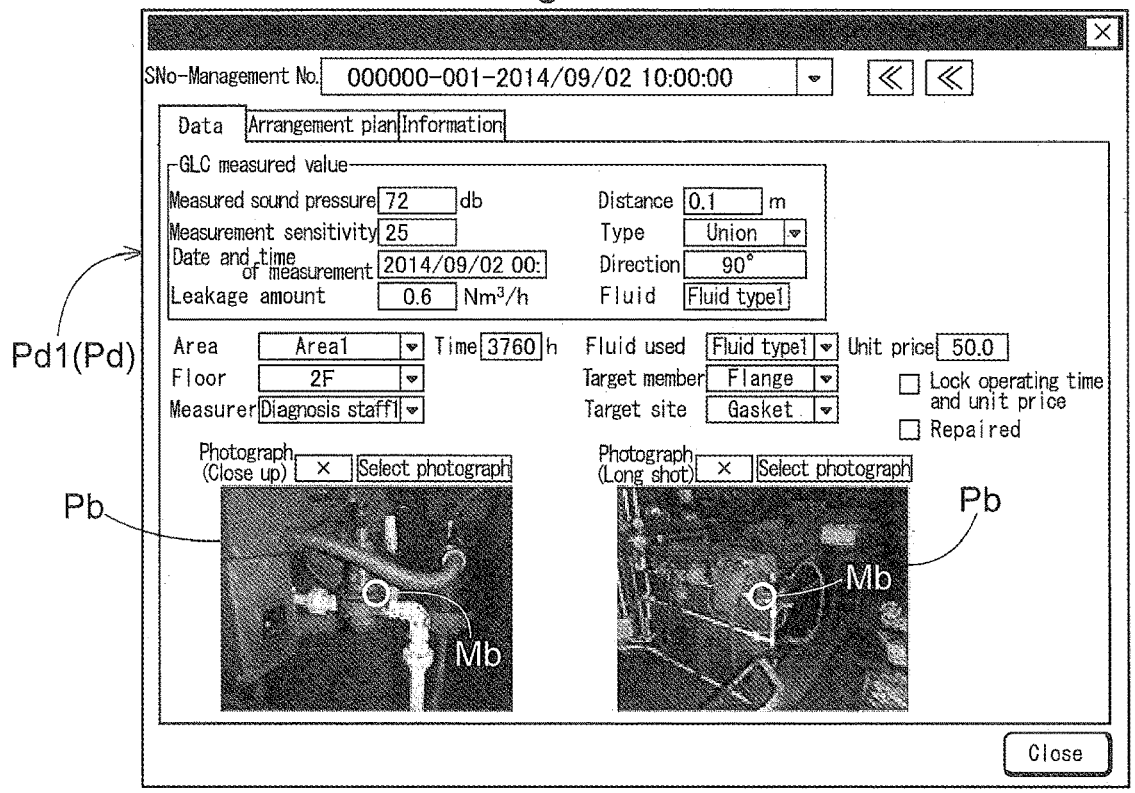
FIG. 14a shows a detailed data image.

Specifically, in the image Pd1, as shown in FIG. 14a, the detected ultrasonic wave value (measured sound pressure), the set sensitivity, the date and time of detection, the amount of leakage (leakage amount), and the input computing conditions (distance, type, direction, fluid) are displayed in the top portion as the fluid leak information; the input positional information (area, floor, target member, target site, type of fluid used) is displayed in the middle portion as the positional information; and the photographed images Pb each having a mark Mb are displayed in the bottom portion. The photographed images Pb displayed in the bottom portion are respectively an image (corresponding to "Close up" in the diagram), such as that shown in FIG. 9, obtained by photographing the leak position while zooming in on the leak position and an image (corresponding to "Long shot" in the diagram) obtained by zooming out so as to also show the equipment around the leak position. If no zoomed-out image has been photographed, the zoomed-out image portion is left blank. Moreover, the name of the diagnosis staff (name of measurer), the annual operating time of the plant, the unit price of the fluid used, the checkbox indicating whether to lock the operating time and the unit price, and the checkbox indicating whether repair has been finished are shown in the middle portion as other information. In this case as well, various data editing operations, such as rewriting and writing of the various kinds of information, replacement of the photographed images Pb, and alteration of the positions of the mark Mb on a photographed images Pb, can be performed through operations of the operation unit 26. In the case where the data is edited, the database Db is updated in accordance with the edit.

Figure 14B:
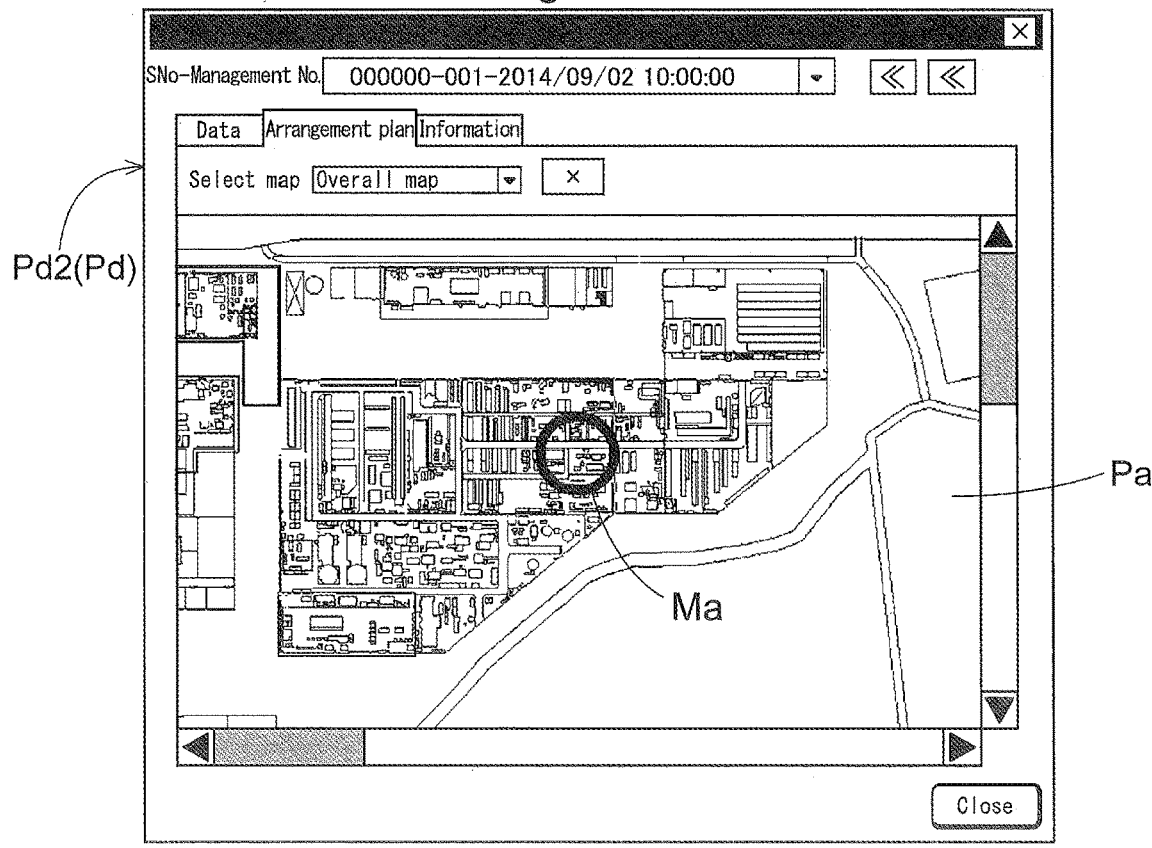
FIG. 14b shows a detailed data image.

In the arrangement plan image Pd2, as shown in FIG. 14b, an image in which a mark Ma is placed on the overall configuration diagram image of the plant recorded in the database Db in accordance with the position indicated by the mark Ma corresponding to the selected fluid leak portion is displayed. The position of the mark Ma is editable through an operation of the operation unit 26. In the case where the data is edited, the contents of the collected data D stored in the storage unit 28 are updated accordingly. Moreover, a configuration is adopted in which the displayed overall configuration diagram image may be scaled up or down in accordance with an operation of the operation unit 26, or the displayed portion of the overall configuration diagram image is changed by scrolling through the overall configuration diagram image.

Figure 14C:
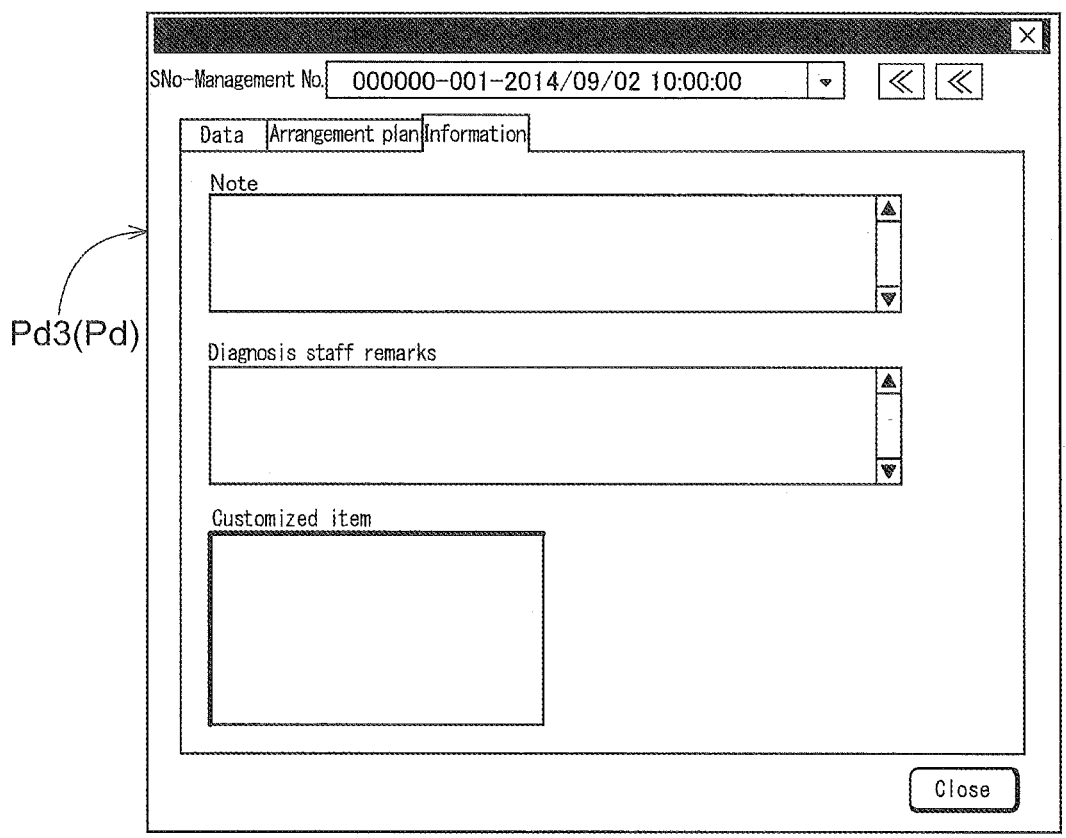
FIG. 14c shows a detailed data image.

In the supplementary information image Pd3, as shown in FIG. 14c, a remarks field (corresponding to "Note" in the diagram) in which the detailed place information is displayed, the diagnosis staff remarks field in which a message from the diagnosis staff is entered, an edit field (corresponding to "Customized item" in the diagram) in which the details of data editing of the images Pd1 and Pd2 are entered are displayed. In this case as well, data editing, such as rewriting and writing, of the individual fields can be performed through operations of the operation unit 26, and in the case where the data is edited, the database Db is updated accordingly.

The above-described detailed data displaying function makes it possible to collectively know and manage data on fluid leak portions for each fluid leak portion individually. Also, in combination with the database displaying function, the detailed data displaying function makes it possible to effectively manage the database Db.

Leak Portion Map Producing Unit 34

Figure 15A:
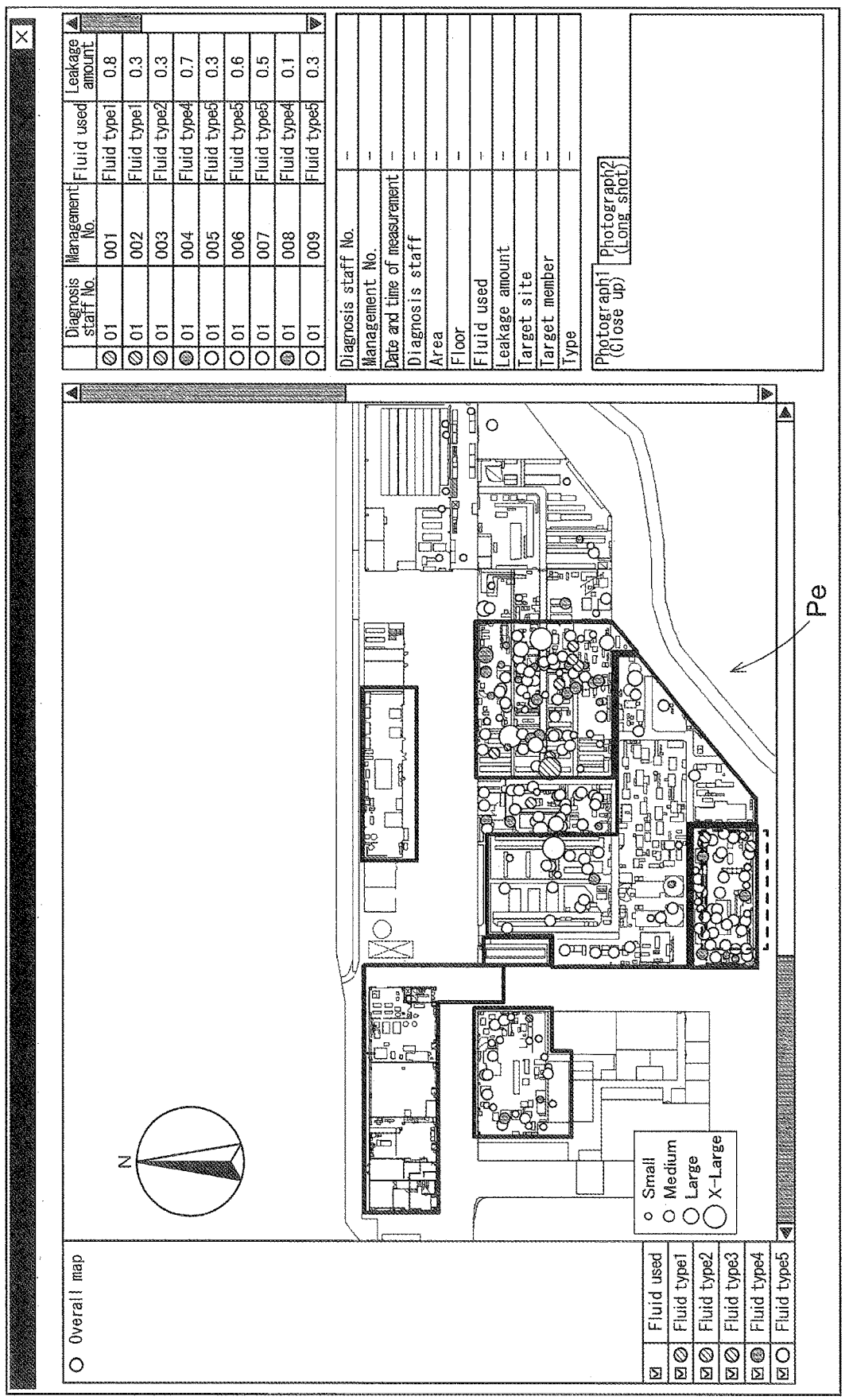
FIG. 15a shows a map image.

The leak portion map producing unit 34 accesses the database Db via the database management unit 32, produces, as shown in FIG. 15a, a map image (leak portion display image) Pe in which, with respect to the positional data indicating the positions of respective fluid leak portions in the plant, indicators representing the respective fluid leak portions are displayed superimposed on the overall configuration diagram image (or the partial configuration diagram image) of the target plant at locations corresponding to the positional data of the respective fluid leak portions on the overall configuration diagram image, and displays the produced map image Pe on the display unit 30. Specifically, coordinate values, which represent the position indicated by the mark Ma, in the area map image Pa are converted into coordinate values in the overall configuration diagram image, the converted coordinate values are used as the positional data, and an indicator is disposed at the location indicated by the converted coordinate values. In the map image Pe, the indicators are configured to be displayed in a state in which the indicators are associated with the amount of fluid leakage and the type of leaking fluid at the respective corresponding fluid leak portions. Specifically, in FIG. 15a, the amounts of fluid leakage are classified into four levels, the higher the level of the amount of fluid leakage an indicator belongs to, the larger the size of the indicator that is displayed, and furthermore, the indicators are displayed in a color-coded manner with colors that are respectively set for different types of leaking fluid. It should be noted that, although the case where the indicators are associated with the amount of fluid leakage and the type of leaking fluid at the respective corresponding fluid leak portions is described here, the indicators may also be displayed associated with other data, such as, for example, the area or the floor to which each fluid leak portion belongs, the device that is leaking fluid or the site of the fluid leak (i.e., target member or target site of the collected data D), the date and time of detection, or the name of the diagnosis staff.

The leak portion map producing unit 34 is configured to display only a specific indicator on the map image Pe, to scale up or down the map image Pe and display the resulting map image Pe, or to display an indicator with its display format changed, in accordance with an instruction received through the operation unit 26.

Figure 15B:
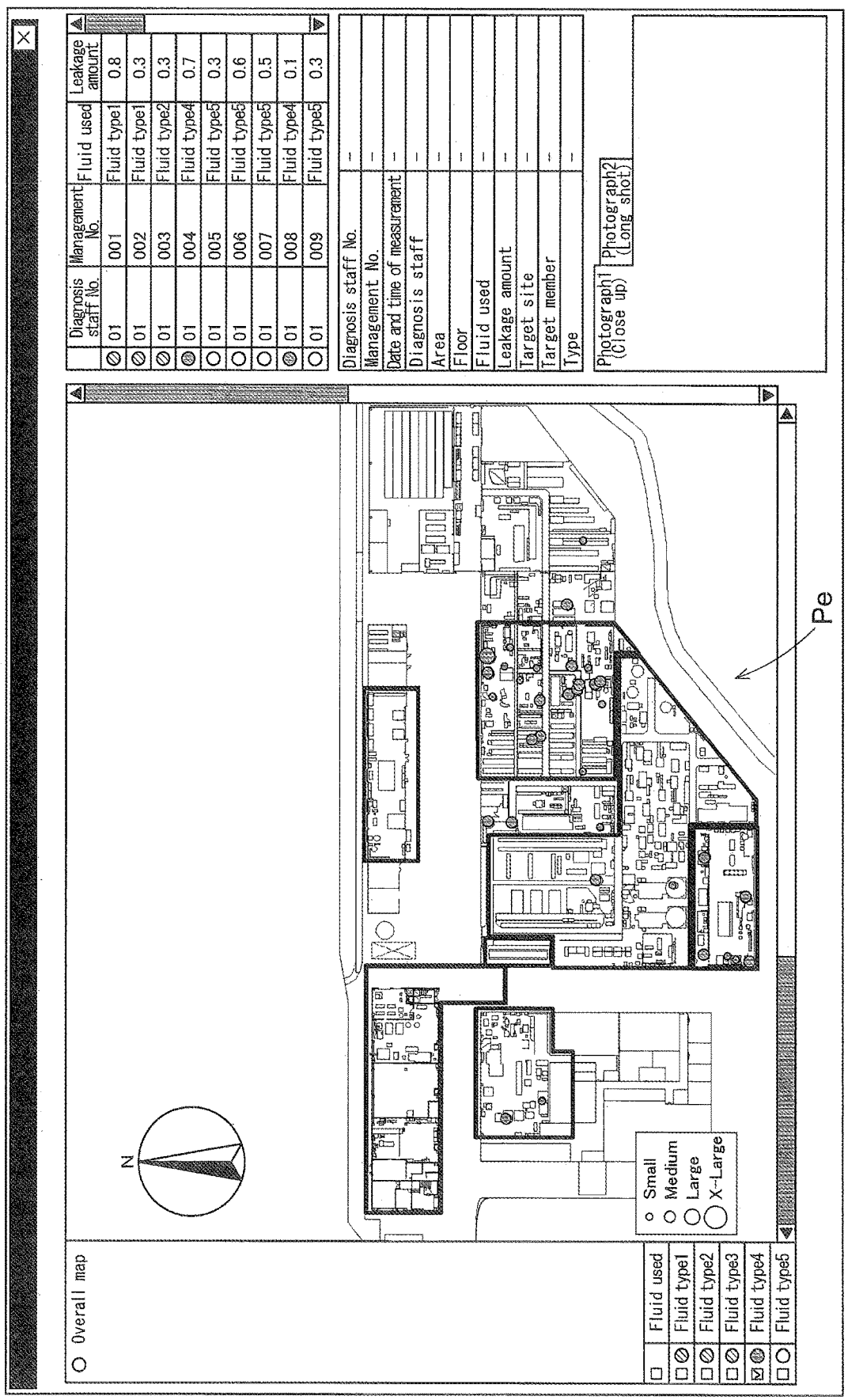
FIG. 15b shows a map image.

Specifically, only those indicators that are associated with one or two or more types of leaking fluid selected through the operation unit 26 can be displayed on the map image Pe. For example, in FIG. 15b, only those indicators that are associated with "Fluid type 4" of the type of leaking fluid are displayed. It should be noted that, in addition to the type of leaking fluid, only those indicators that belong to a level of the amount of fluid leakage selected through the operation unit 26 can be displayed on the map image Pe. Moreover, in the case where the indicators are associated with other items of collected data D, among categories (for example, if indicators are associated with devices that leak fluid, the types of the devices) included in the data associated with the indicators, only those indicators that belong to a category selected through the operation unit 26 can be displayed on the map image Pe. Moreover, it is also possible to hide an indicator corresponding to a repaired fluid leak portion.

Figure 15C:
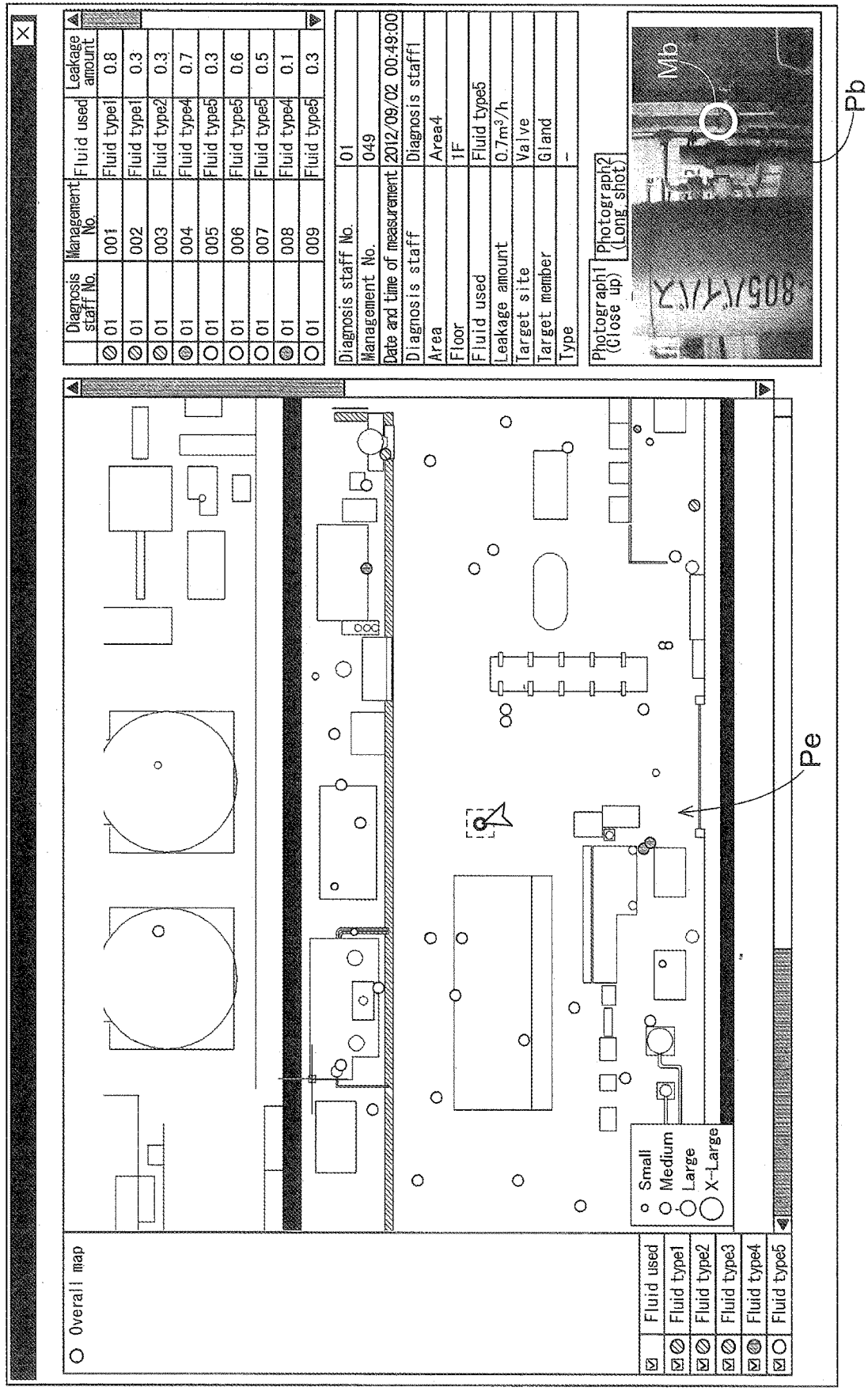
FIG. 15c shows a map image.

Also, in addition to scaling up or down the map image Pe, it is possible to change the displayed portion of the map image Pe by scrolling the display screen. FIG. 15c shows a portion enclosed by the dashed lines in FIG. 15a, the portion being displayed in a scaled-up manner as a result of scaling up and scrolling through the map image Pe.

Also, it is possible to uniformly change (scale up or down) the size of all the indicators at a ratio as instructed through the operation unit 26, and display the resulting indicators on the map image Pe. The shape (circle, triangle, square, or the like), the color, and the size of indicators that are displayed can also be changed freely. Moreover, the form of association with the data (that is, which display format of the indicators is to be changed for each category included in the data) can also be changed freely.

Furthermore, as shown in FIG. 15c, when an indicator is selected through the operation unit 26, the database Db is accessed, and the device that is leaking fluid and the site of the fluid leak (i.e., target member and target site of the collected data D), the amount of fluid leakage at that fluid leak portion, the type of leaking fluid at that fluid leak portion, and a photographed image Pb of that fluid leak portion are displayed next to the map image Pe as the detailed data on a fluid leak portion corresponding to the selected indicator.

It should be noted that in the case where the collected data D with respect to a plurality of plants is cumulatively stored in the database Db, the map image Pe with respect to a plant selected through the operation unit 26 out of a plurality of plants is displayed, and the displayed map image Pe is appropriately switched and changed to the map image Pe of a target plant as instructed through the operation unit 26.

The above-described leak portion map producing unit 34 makes it possible to deduce the extent of deterioration of the equipment of a target plant and a defect in the equipment from a trend in the distribution of the indicators displayed on the map image Pe. For example, with respect to an area in the target plant where a large number of fluid leak portions are present, it can be deduced that the equipment is deteriorating, or if the number of fluid leak portions or the amount of fluid leakage is abnormally large, it can be deduced that some kind of defect has occurred in the equipment. Moreover, it is possible to comprehend a trend in the data distribution of fluid leaks in the target plant based on the distribution of the indicators, and it is possible to devise an efficient plan for future fluid leak diagnosis, for example, which area or which type of fluid used is to be given priority in performing diagnosis or to be diagnosed frequently. In the above-described manner, various analyses can be performed by using the leak portion map producing unit 34.

Leak Trend Deducing Unit 35

In the case where the results of fluid leak diagnoses that have been performed with respect to the same plant in the past are accumulated and stored in the database Db, the leak trend deducing unit 35 generates fluid leak trend information indicating a chronological fluid leak trend in the target plant, in which information regarding fluid leak portions in the plant that have been detected in a plurality of fluid leak diagnoses from past to present, and displays the generated fluid leak trend information on the display unit 30. After a fluid leak diagnosis has been performed, fluid leak portions are repaired based on the results of the diagnosis. Therefore, essentially, data on the plurality of fluid leak diagnoses from past to present is data on fluid leak portions that have newly developed between a previously performed fluid leak diagnosis and the latest fluid leak diagnosis of the plurality of fluid leak diagnoses. Thus, the fluid leak trend information indicates information regarding fluid leak portions that have newly developed in each of the intervals between the plurality of fluid leak diagnoses from past to present (interval between a preceding fluid leak diagnosis and a subsequent fluid leak diagnosis).

For example, the leak trend deducing unit 35 generates, as the fluid leak trend information, an image in which map images Pe (i.e., images in each of which indicators representing fluid leak portions are displayed superimposed on the overall configuration diagram image of the target plant at locations corresponding to the positional data of the respective fluid leak portions on the overall configuration diagram image) produced by the leak portion map producing unit 34 for the respective fluid leak diagnoses are arranged. Alternatively, the leak trend deducing unit 35 may generate a map image Pe in which indicators representing fluid leak portions are displayed superimposed on the overall configuration diagram image of the target plant at locations corresponding to the positional data of the respective fluid leak portions on the overall configuration diagram, and the indicators representing the fluid leak portions detected in different fluid leak diagnoses of the plurality of fluid leak diagnoses are displayed in different display formats (colors or shapes (circles, triangles, squares, or the like)). Moreover, the leak trend deducing unit 35 may also generate, as the fluid leak trend information, data in which, with respect to the entire target plant or with respect to each area in the target plant, the total number of fluid leak portions, the total amount of fluid leakage, and the like for each type of leaking fluid in the individual fluid leak diagnoses are arranged. The fluid leak diagnosis data that is displayed as the fluid leak trend information may be data regarding all of the fluid leak diagnoses from past to present, or may be data regarding only a selected fluid leak diagnosis from among all of the fluid leak diagnoses.

With the above-described fluid leak trend information, it is possible to comprehend changes in fluid leak portions, types of leaking fluid, and amounts of fluid leakage in the target plant from past to present, and therefore, it is possible to comprehend a fluid leak trend in the target plant including a chronological trend. Thus, the deduction can be performed taking into account not only the trend in the data distribution of fluid leak portions but also the chronological trend of fluid leaks. For example, it can be deduced that the equipment is deteriorating in an area in the target plant where fluid leaks occur at a high frequency, and it can be deduced that some defect has occurred in the equipment in the case where the fluid leak trend has changed toward an abnormally large number of fluid leak portions or an abnormally large amount of fluid leakage when compared with a past trend. Consequently, it is possible to even more precisely deduce the extent of deterioration of the equipment and a defect in the equipment. Moreover, by taking into account not only the trend in the data distribution of fluid leak portions but also the chronological trend of fluid leaks, it is possible to devise an even more efficient plan for future fluid leak diagnoses, such as an appropriate interval between fluid leak diagnoses in the target plant and which area or which type of fluid used is to be given priority in performing diagnosis or to be frequently diagnosed. Moreover, based on changes in fluid leaks in the target plant from past to present, it is possible to confirm the effect of continuously performing fluid leak diagnoses and repairs based on the results of the diagnoses.

It should be noted that the leak trend deducing unit 35 may also include an algorithm for analyzing a chronological fluid leak trend in the target plant based on changes in fluid leaks in the target plant that are indicated by the fluid leak trend information or other data on fluid leak portions detected in the individual fluid leak diagnoses, and evaluating the extent of deterioration of the equipment and a defect in the equipment in the target plant based on the changes in fluid leaks and the chronological fluid leak trend, and an algorithm for producing a plan for future fluid leak diagnoses that is appropriate for the changes in fluid leaks and the trend of fluid leaks. Therefore, the leak trend deducing unit 35 may be configured to not only produce and display the fluid leak trend information but also to produce evaluation information regarding the extent of deterioration of the equipment and a defect in the equipment and a plan for future fluid leak diagnoses and display the evaluation information and the plan on the display unit 30.

Plant Comparison Information Generating Unit 36

In the case where the results of fluid leak diagnoses that have been performed for a plurality of plants are accumulated and stored in the database Db, the plant comparison information generating unit 36 generates plant comparison information for comparing fluid leak trends in two or more plants to be compared and displays the plant comparison information on the display unit 30. For example, the plant comparison information generating unit 36 generates, as the plant comparison information, an image in which map images Pe of each plant that have been produced by the leak portion map producing unit 34 are arranged for each plant. Moreover, the plant comparison information generating unit 36 generates, as the plant comparison information, data in which, with respect to the entirety of each of the plants to be compared or with respect to each area in the plants to be compared, a total number of fluid leak portions and a total amount of fluid leakage for each type of leaking fluid in the fluid leak diagnosis are arranged. In the case where data on a plurality of fluid leak diagnoses that have been performed from past to present with respect to the plants to be compared is accumulated in the database Db, the plant comparison information generating unit 36 can generate the plant comparison information regarding data on a fluid leak diagnosis selected through the operation unit 26 out of the plurality of fluid leak diagnoses recorded in the database Db. Moreover, the plant comparison information generating unit 36 can generate, as the plant comparison information, data in which sets of fluid leak trend information generated by the leak trend deducing unit 35 are arranged for each plant to be compared. The number of plants that are compared in the plant comparison information is not limited, and may be any number equal to or greater than 2.

With the above-described plant comparison information, it is possible to know differences in fluid leaks (differences in trend of various kinds of data such as distribution of fluid leak portions, type of leaking fluid, and amount of fluid leakage, and the differences in chronological trend of fluid leaks from past to present) between the plants to be compared. Then, by analyzing the relationship of these differences in fluid leaks with differences in operating conditions between the plants to be compared (equipment configurations of the plants, operating times, amounts of various fluids used, etc.), it is possible to deduce which difference in operating conditions between the plants to be compared causes the differences in fluid leaks between those plants, that is, the cause of the differences in fluid leaks, and thus, it is possible to take measures against fluid leaks in the target plant.

It should be noted that the plant comparison information generating unit 36 may also include an algorithm for reading the operating conditions of the plants to be compared from the outside and analyzing the relationship of the differences in fluid leaks between the plants to be compared with the differences in operating conditions between those plants, and an algorithm for deducing, based on the analyzed relationship, the cause of the differences in fluid leaks between the plants to be compared, and proposing measures to be taken against fluid leaks in the target plant. Thus, the plant comparison information generating unit 36 may be configured to not only generate and display the plant comparison information but to also generate the analysis results with respect to the relationship of the differences in fluid leaks between the plants to be compared with the differences in operating conditions between those plants, the cause of the differences in fluid leaks, and the measures to be against fluid leaks and display them on the display unit 30.

Diagnosis Plan Evaluating Unit 37

A fluid leak diagnosis of a plant is performed for a plurality of days in accordance with a preliminarily planned diagnostic process. The fluid leak diagnosis is not necessarily performed in all portions of the plant. Depending on the size of the plant, the complexity of the equipment of the plant, and the cost required for diagnosis, there are cases where a fluid leak diagnosis is performed within a limited number of days with areas, devices, and the like to be diagnosed in the plant being limited in advance. In these cases, areas and devices to be diagnosed, the route along which diagnosis is to be performed, and the like are determined as a diagnosis plan based on certain criteria. However, this diagnosis plan is not necessarily appropriate for any plant to be diagnosed. Therefore, there may be cases where an expected number of fluid leak portions are not found in the middle of a fluid leak diagnosis, and then, it is necessary to contemplate changing the diagnosis plan for the rest of the diagnosis.

In such cases, the diagnosis plan evaluating unit 37 generates a diagnosis range display image in which, with respect to the plant in the middle of the fluid leak diagnosis, an overall configuration diagram image (or a partial configuration diagram image) of that plant is displayed such that a diagnosed region that has already been diagnosed in the fluid leak diagnosis and an undiagnosed region are differentiated from each other, and indicators are displayed on the overall configuration diagram of the plant, the indicators being superimposed on locations corresponding to the positional data (positions indicated by marks Ma) of respective fluid leak portions that have been detected in the diagnosed region, and displays the generated diagnosis range display image on the display unit 30. With regard to the display format in which a diagnosed region and an undiagnosed region are differentiated from each other, the diagnosed region may be enclosed by a line, or the diagnosed region and the undiagnosed region are displayed in a color-coded manner, for example. As in the case of the leak portion map producing unit 34, the indicators are displayed in a state in which they are associated with the amount of fluid leakage and the type of leaking fluid at the respective corresponding fluid leak portions.

With the above-described diagnosis range display image, it is possible to comprehend the region where the fluid leak diagnosis has been performed and the trends in distributions of fluid leak portions, types of leaking fluid, and amounts of fluid leakage in that region. Thus, it is possible to evaluate whether the diagnosis plan that has been carried out for the diagnosed region is appropriate. Furthermore, it is possible to infer the trend of fluid leaks in the undiagnosed region from the trend of fluid leaks in the diagnosed region. The evaluation of the diagnosis plan and the inferring of the trend of fluid leaks in the undiagnosed region are performed by, for example, referring to the trend of fluid leaks in the plant in the past, the trend of fluid leaks in another plant, or the like based on the trend of fluid leaks in the diagnosed region. Then, based on the inferred trend of fluid leaks in the undiagnosed region, the plan for fluid leak diagnosis of the undiagnosed region can be changed to an effective plan suited to the trend of fluid leaks. For example, in the case where it is deduced that there is a possibility that fluid leaks are occurring in clusters in a region that was not originally scheduled to be diagnosed, the diagnosis plan is changed so that this region will be diagnosed. As described above, the diagnosis plan evaluating unit 37 makes it possible to evaluate the appropriateness of the plan for fluid leak diagnosis whenever necessary while performing the fluid leak diagnosis and to change the plan to a more effective plan.

It should be noted that the diagnostic process display unit may also include an algorithm for evaluating the appropriateness of the present diagnosis plan from the trend of fluid leaks in the diagnosed region and also inferring the trend of fluid leaks in the undiagnosed region, and an algorithm for proposing a plan for fluid leak diagnosis of the undiagnosed region based on the inferred trend of fluid leaks in the undiagnosed region. Thus, the diagnostic process display unit may be configured to not only generate and display the diagnosis range display image but also to read a diagnosis plan for the target plant from the outside, generate evaluation information regarding the appropriateness of the present diagnosis plan, information regarding the trend of fluid leaks in the undiagnosed region, and a plan for fluid leak diagnosis of the undiagnosed region, and display them on the display unit 30. In this case, data collected through fluid leak diagnoses in the past with respect to the plant to be subjected to a fluid leak diagnosis and data collected through fluid leak diagnoses of other plants may be accumulated and stored in the database Db, and the evaluation of the appropriateness of the present diagnosis plan and the inferring of the trend of fluid leaks in the undiagnosed region may be performed based on the accumulated data.

Pipe Connection Deducing Unit 38

Typically, in a plant in which various fluids, such as various gases, air, steam, and the like, are used, branch pipes are added to the piping due to repairs, replacement, and the like of piping and devices after the plant was constructed. In that case, the connection state of the piping is complex, and it is difficult to know which pipe is connected to which pipe, for example. Furthermore, in the case where the piping diagram has never updated after the plant was constructed, a pipe that is not shown on the piping diagram is present in the plant. However, being unable to accurately comprehend the connection state of piping causes a problem in terms of managing the plant.

In such a case, the pipe connection deducing unit 38 reads the piping diagram of the target plant from the outside, generates a pipe connection deducing image in which indicators are displayed on the read piping diagram, the indicators being superimposed on locations corresponding to the positional data (positions on the piping diagram into which positions indicated by marks Ma are respectively converted) of respective fluid leak portions, and displays the generated image on the display unit 30. Alternatively, the pipe connection deducing unit 38 may generate a pipe connection deducing image in which the read piping diagram and an image of a range corresponding to the range shown in the piping diagram, of the above-described map image Pe in which the indicators representing the respective fluid leak portions are displayed superimposed on the overall configuration diagram (or the partial configuration diagram) of the plant are displayed next to each other.

Based on these pipe connection deducing images, for example, in the case where a fluid leak portion is located at a position where no pipe is shown on the read piping diagram, it is clear that a new pipe was provided at that position after the plant was constructed. Moreover, based on a trend in the distribution of fluid leak portions (e.g., fluid leak portions occur successively in a specific series of pipes, or no fluid leak portion has developed in a specific series of pipes), it is possible to deduce a series of pipes on the piping diagram that are in a connected state. As described above, a connected state of piping can be deduced from the pipe connection deducing image, and the piping diagram can be updated based on the deduction. Furthermore, in the case where a fluid leak portion is located on an unused pipe to which the flow of fluid has been cut off, it is clear that the flow of fluid to that unused pipe has not been completely cut off.

It should be noted that, in the case where a fluid leak portion is located at a position where no pipe is shown on the read piping diagram, an indicator corresponding to that fluid leak portion may be displayed in a highlighted manner. Thus, it can be easily found that a new pipe has been provided in that position after the plant was constructed. Moreover, an unused pipe to which the flow of fluid has been cut off on the read piping diagram may be displayed differentiated from other pipes that are in use by, for example, displaying the unused pipe in a different color from the color of the other pipes. Furthermore, in the case where a fluid leak portion is located on an unused pipe, the indicator corresponding to that fluid leak portion may be displayed in a highlighted manner. Thus, it can be easily comprehended that a fluid leak is occurring in the unused pipe, and it can be easily found that the flow of fluid to the unused pipe has not been completely cut off. Any methods with which an indicator can be displayed in a highlighted manner compared with other indicators may be used as the method for highlighting an indicator, and examples thereof include displaying a large indicator, displaying the indicator in a different color, and displaying the indicator with a thick line.

Moreover, the pipe connection deducing unit 38 may also include an algorithm for deducing a series of pipes that are in a connected state on the piping diagram from the trend in the distribution of fluid leak portions. Thus, the pipe connection deducing unit 38 may be configured to generate deduction information regarding the connected state of pipes and, in accordance with the deduction information, display a pipe connection deducing image in a state in which the series of pipes that have been deduced to be in a connected state are displayed in a highlighted manner, displayed in the same color, or displayed with lines drawn along those pipes, for example, so as to indicate that the pipes are connected.

Repair Schedule Producing Unit 39

The repair schedule producing unit 39 produces a repair schedule S for fluid leak portions in the plant based on the positional data and the like of the fluid leak portions, and displays the repair schedule S on the display unit 30. For example, based on the positional data on the fluid leak portions to be repaired, a total moving distance required for a repair work or the order in which the repair work is to be performed within a short total moving time is obtained through computation. Moreover, for each fluid leak portion, a repair slip in which the amount of fluid leakage at the fluid leak portion, the type of leaking fluid at the fluid leak portion, the target member (device that leaks fluid), the target site (site of the device where the fluid leak has occurred), detailed place information, and the photographed image Pb and the arrangement plan image Pd2 of the fluid leak portion are collected is generated, and then, data, such as that shown in FIG. 16, in which the repair slips are arranged in the computed order in which the repair work is performed is produced as the repair schedule S. In this case, for each area in the plant, the order in which fluid leak portions in that area are repaired may also be obtained.

Moreover, a fluid leak portion at which the amount of fluid leakage is small may be left as is without being repaired. For this reason, in producing a repair schedule S, it is also possible to narrow down fluid leak portions to be repaired based on the amounts of fluid leakage at the respective fluid leak portions and produce the repair schedule with respect to the narrowed-down fluid leak portions.

It should be noted that the type of repair work, such as that involving a replacement member, a tool, and the like required for repairing the fluid leak portion, varies according to the target member and the target site, and thus, in view of the requirements with respect to a replacement member or a tool required for repair, there may be cases where, in order to perform an efficient repair work, it is better to perform repair with a higher priority given to fluid leak portions for which the same type of repair work is to be performed, rather than to attach greater importance to the total moving distance during the repair work. For this reason, in performing computation with respect to the repair work, the order in which the repair work is to be performed may be obtained taking into account not only the positional data of fluid leak portions but also the target members and the target sites.

Monetary Conversion Unit 40

Figure 17:
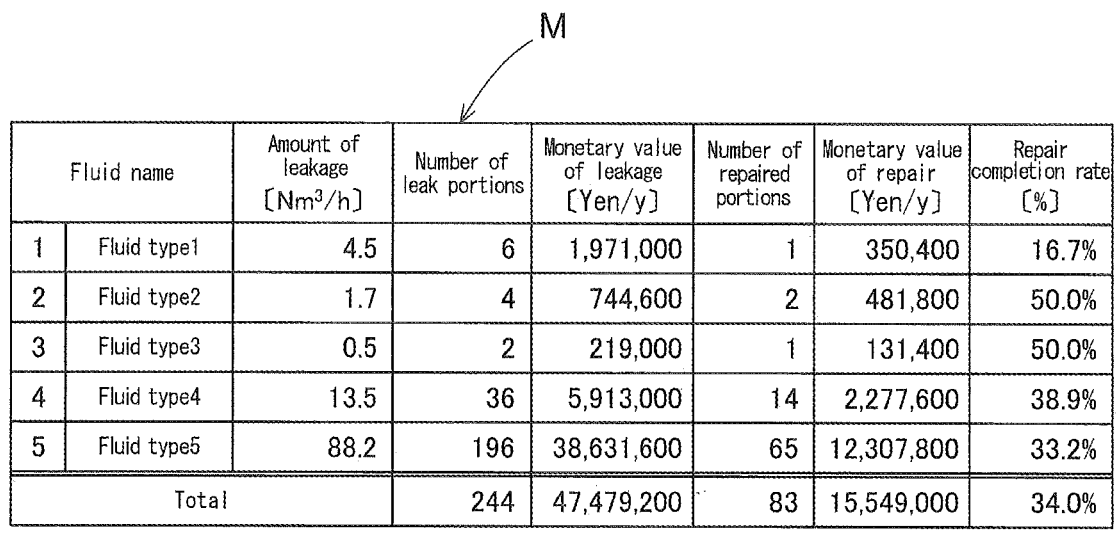
FIG. 17 shows a monetary conversion table.

The monetary conversion unit 40 computes the value of the amount of fluid leakage at each fluid leak portion in monetary terms, and produces a monetary conversion table. For example, in the case where the amount of fluid leakage at each fluid leak portion recorded in the database Db is an amount of fluid leakage per unit time, the monetary conversion unit 40 computes, with respect to all the fluid leak portions excluding the repaired fluid leak portions, a total amount of fluid leakage per unit time for each type of leaking fluid. Then, based on the computed total amount of fluid leakage per unit time for each type of leaking fluid, the annual operating time of the plant, and the unit price per unit amount of fluid of each fluid that is used, the monetary conversion unit 40 computes the value of "amount of fluid leakage×operating time×unit price" in monetary terms for each type of leaking fluid, and adds up the converted monetary values for all of the types of leaking fluid, thereby computing the amount of annual loss caused by fluid leaks in the target plant. Then, the monetary conversion unit 40 generates a monetary conversion table M, such as that shown in FIG. 17, including the converted monetary values for the respective types of leaking fluid (i.e., the values of annual loss caused by fluid leaks with respect to the respective types of leaking fluid) and the value of annual loss caused by fluid leaks in the target plant, and displays the monetary conversion table M on the display unit 30.

The above-described monetary conversion unit 40 makes it possible to comprehend how much loss has occurred in the plant due to fluid leaks at present. Thus, it is possible to clearly comprehend the magnitude of the economic effect of repairing the fluid leak portions will be.

Compressor Judging Unit 41

Based on the total amount of fluid leakage with respect to the fluid leak portions in the target plant, the compressor judging unit 41 generates compressor judgment information for judging, assuming the fluid leak portions in the target plant are repaired, whether the number of compressors in the target plant and the models of the compressors are appropriate for the plant after repair.

Specifically, first, the compressor judging unit 41 acquires the number of compressors used in the target plant, the models of the compressors, the deliverable amount of fluid Ld for each model, and the amount of fluid usage La per unit time for each type of fluid used in the target plant by reading them from the outside. Then, the compressor judging unit 41 computes a total amount of fluid leakage Lb per unit time for each fluid type from the amounts of fluid leakage at the respective fluid leak portions stored in the database Db. Furthermore, the compressor judging unit 41 subtracts the total amount of fluid leakage Lb for each fluid type from the amount of fluid usage La for each type of fluid used, thereby computing the amount of fluid usage after repair Lc that is necessary for the operation of the plant after repair.

It should be noted that the total amount of fluid leakage Lb per unit time for each fluid type is the amount of fluid leakage that can be reduced by repairing the fluid leak portions, of the amount of fluid usage La per unit time for each type of fluid used in the target plant, and corresponds to the amount of fluid that is not related to the operation of the plant and that is wastefully generated by the compressors in the plant. That is to say, the required amount of fluid usage Lc, which is obtained by subtracting the total amount of fluid leakage Lb for each fluid type from the amount of fluid usage La for each type of fluid used, means a truly necessary and sufficient amount of fluid usage for the operation of the plant.

Moreover, for each type of fluid used, a total deliverable amount of fluid Le is computed by adding up the deliverable amounts of fluid Ld by each individual compressor used to deliver a corresponding fluid, a deliverable amount of fluid Ld being the amount of fluid that can be delivered by each compressor model.

Then, for the purpose of judging the number of compressors used in the plant and the models of the compressors, the compressor judging unit 41 generates, as the compressor judgment information, data in which, for each type of fluid used, the amount of fluid usage La per unit time, the total amount of fluid leakage Lb per unit time, the post-repair fluid usage amount Lc per unit time, the deliverable amounts of fluid Ld corresponding to individual models of the compressors used to deliver the fluid to be used, and the total deliverable amount of fluid Le, in the target plant, are arranged, and displays the generated data on the display unit 30. With this compressor judgment information, it is possible to evaluate how much wastage occurs in the compressors that are used at present due to fluid leaks. For example, by making a comparison of the post-repair fluid usage amount Lc with the deliverable amounts of fluid Ld and the total deliverable amount of fluid Le, it can be found that, in order to deliver an amount of fluid corresponding to the post-repair fluid usage amount Lc, a number of compressors larger than necessary will be used, or a compressor having a larger than necessary deliverable amount of fluid Ld will be used. Furthermore, based on the post-repair fluid usage amount Lc, an optimal number of compressors and an optimal combination of models of compressors can be conceived.

Thus, it is possible to comprehend not only the loss in the plant directly caused by the fluid leaks that can be determined by the monetary conversion unit 40 but also the loss caused by wasteful usage conditions of the compressors due to fluid leaks, and therefore, it is possible to even more clearly comprehend the magnitude of the economic effect of repairing the fluid leak portions.

It should be noted that, although an example in which the various amounts of fluid La to Le per unit time are displayed on the display unit 30 as the compressor judgment information to make a judgment about the number of compressors and the models of the compressors has been described above, it is also possible to input or compute amounts of electric power Wa to We respectively corresponding to the amounts of fluid La to Le and display the amounts of electric power Wa to We on the display unit 30 as the compressor judgment information to make a judgment regarding the number of compressors and the models of the compressors. In this case, the displayed compressor judgment information is composed of the electric power consumption Wa of the compressors per unit time in the target plant, the converted amount of electric power Wb obtained by converting the total amount of fluid leakage Lb per unit time into electric power, the post-repair electric power usage amount We per unit time, the maximum electric power consumption Wd corresponds to individual models of the compressors used to deliver the fluid used, and the total electric power consumption We, which is the sum of the maximum electric power consumptions Wd.

Moreover, the compressor judging unit 41 may include an algorithm for judging, based on the compressor judgment information, assuming the fluid leak portions are repaired, whether the number of compressors that are used at present and the models of the compressors are appropriate for the plant after repair, and an algorithm for deriving, based on the compressor judgment information, an optimal number of compressors and an optimal combination of models of the compressors for the post-repair fluid usage amount Lc. Thus, the compressor judging unit 41 may make a judgment regarding the number and the models of the compressors used in the plant and derive an optimal combination of compressors after the fluid leak portions have been repaired, generate judgment information regarding the compressors that are used at present and combination information regarding the optimal combination of compressors, and display the generated information on the display unit 30.

Diagnostic Report Producing Unit 42

The diagnosis report producing unit 42 produces a diagnosis report X in which all or selected pieces of the data and images produced by the above-described various functional units are collected. For example, as shown in FIG. 18, the diagnosis report producing unit 42 produces a diagnosis report in which the monetary conversion table M produced by the monetary conversion unit 40, a list of leak portions extracted from the data produced by the database management unit 32, the map image Pe produced by the leak portion map producing unit 34, and the repair schedule S produced by the repair schedule producing function are collected.

Implementation of the Present Invention

The maintenance of a plant using the present invention is performed according to the following procedures (a) to (e), for example.

(a) The range of fluid leak diagnosis of a plant is determined by consulting with a client of the plant maintenance. Specifically, whether the fluid leak diagnosis is to be performed over the entire range of the plant or within a partial region of the plant, whether the fluid leak diagnosis is to be performed for all of the pieces of equipment or for only a specific device, and the like are determined through preliminary discussions with the client. In this case, at least a diagnosis range within which, after a fluid leak portion has been found and repaired, the effect of the repair can be comprehended is set.

(b) An overall configuration diagram (or a partial configuration diagram) of the plant and an area map of an area to be diagnosed are obtained from the client, and an overall configuration diagram image and an area map image are input to the host computer 24 and the leakage detecting device R. Moreover, a fluid leak diagnosis plan is devised based on the overall configuration diagram and the area map.

(c) Within the range that has been determined by consulting with the client, a fluid leak diagnosis is performed based on the devised diagnosis plan, and collected data D is input to the host computer 24 to cumulatively store the collected data D in the database Db. At this time, based on a diagnosis range display image produced by the diagnosis plan evaluating unit 37, if necessary, the plan for the fluid leak diagnosis that is currently in progress is evaluated, and modification of the plan with respect to portions that have not been diagnosed is considered.

(d) After the entire diagnostic process has been completed, and the collected data D on all of the fluid leak portions has been input to the host computer 24, various analyses are performed by the analytic processing unit 33 of the host computer 24. Then, a diagnosis report X in which images and information generated by the analytic processing unit 32 are collected is produced by the diagnosis report producing unit 42. It should be noted that the diagnosis report X contains information regarding the economic effect to be achieved by repairing the fluid leak portions, the devising of a plan for repairing of a found fluid leak portion and a plan for future maintenance, and the improvement of the equipment of the plant.

(e) After the diagnosis report X has been produced, the repair work is performed based on the repair schedule S contained in the diagnosis report X. Moreover, the diagnosis report X is presented to the client, and the effects of the plant maintenance are presented to the client. For example, the economic effect of repairing the fluid leak portions may be presented based on the monetary conversion table M and the compressor judgment information, or if the plant comparison information has been generated by the plant comparison information generating unit 36 using the results of fluid leak diagnoses in other plants, measures to be taken against fluid leaks in the target plant may be presented based on the plant comparison information.

Then, simultaneously with the presentation of the diagnosis report X, future maintenance of the plant is proposed to the client. Specifically, the following two options for the plant maintenance are proposed to the client: outsourcing periodic fluid leak diagnoses, or purchasing a device such as the leakage detecting device R and performing fluid leak diagnoses on their own.

In the case where the client chooses to outsource fluid leak diagnoses, if there is any range in the target plant within which the fluid leak diagnosis has not been performed, a fluid leak diagnosis plan for the remaining ranges is devised, and a fluid leak diagnosis as well as the repair of a fluid leak portion found by the diagnosis are performed. Then, a future plant maintenance plan (intervals, etc.) is determined through consultation while referring to the diagnosis report X.

In the case where the client chooses to purchase a device such as the leakage detecting device R and perform fluid leak diagnoses on their own, the criteria on which the plant maintenance is to be carried out are proposed to the client while referring to the diagnosis report X. Moreover, a diagnosis staff is determined, and the diagnosis staff is trained to perform fluid leak diagnosis using the leakage detecting device R.

Other Embodiments (1) The function realized by the above-described leak trend deducing unit 35 can be realized by not only the host computer 24, but can also be realized by a fluid leakage data management apparatus including an input unit to which data on fluid leak portions detected through a fluid leak diagnosis as a result of the fluid leak diagnosis of a plant is input, and a storage unit in which the data input to the input unit is cumulatively stored, the management apparatus including a leak trend deducing unit that generates, from the results of a plurality of fluid leak diagnoses of the same plant stored in the storage unit, fluid leak trend information indicating a chronological fluid leak trend in the target plant.

In the management apparatus of the other embodiment (1), the leak trend deducing unit may also be configured to generate, as the fluid leak trend information, leak portion display images for the respective fluid leak diagnoses in each of which leak portion display images, with respect to the positional data indicating the positions, in the target plant, of the respective fluid leak portions input to the input unit, indicators representing the respective fluid leak portions are displayed superimposed on the configuration diagram image of the target plant at locations corresponding to the positional data of the respective fluid leak portions on the configuration diagram image, and to generate an image in which the leak portion display images are arranged.

In the management apparatus of the other embodiment (1), the leak trend deducing unit may also be configured to generate, as the fluid leak trend information, an image in which, with respect to the positional data indicating the positions, in the target plant, of the respective fluid leak portions for all of the fluid leak diagnoses, indicators representing the respective fluid leak portions are displayed superimposed on the configuration diagram image of the target plant at locations corresponding to the positional data of the respective fluid leak portions on the configuration diagram image, and also the indicators representing the fluid leak portions detected in different fluid leak diagnoses are displayed in different display formats.

In the management apparatus of the other embodiment (1), the leak trend deducing unit may also be configured to generate, as the fluid leak trend information, data in which, with respect to the entire target plant or with respect to each area in the target plant, a total number of fluid leak portions and a total amount of fluid leakage for each type of leaking fluid in the individual fluid leak diagnoses are arranged.

In the management apparatus of the other embodiment (1), the leak trend deducing unit may also be configured to analyze the chronological fluid leak trend in the target plant based on changes in fluid leaks in the target plant indicated by the data on the fluid leak portions detected in the individual fluid leak diagnosis and generate evaluation information in which the extent of deterioration of the equipment in the target plant and a defect in the equipment are evaluated from the changes in fluid leaks and the chronological fluid leak trend. Furthermore, the leak trend deducing unit may also be configured to generate a plan for future fluid leak diagnoses from the changes in fluid leaks and the chronological fluid leak trend.

It should be noted that, in the management apparatus of the other embodiment (1), the above-described configurations can be used not only alone but also in combination. Moreover, the management apparatus of the other embodiment (1) may also have the other functions of the host computer 24.

(2) The function realized by the above-described plant comparison information generating unit 36 can be realized by not only the host computer 24, but can also be realized by a fluid leakage data management apparatus including an input unit to which data on fluid leak portions detected through a fluid leak diagnosis as a result of the fluid leak diagnosis of a plant is input, and a storage unit in which the data input to the input unit is cumulatively stored, the management apparatus including a plant comparison information generating unit that generates, from the results of fluid leak diagnoses of a plurality of plants cumulatively stored in the storage unit, plant comparison information for comparing fluid leak trends in two or more plants to be compared.

In the management apparatus of the other embodiment (2), the plant comparison information generating unit may be configured to generate leak portion display images for the respective target plants to be compared in each of which leak portion display images, with respect to the positional data indicating the positions, in the target plant, of the respective fluid leak portions input to the input unit, indicators representing the respective fluid leak portions are displayed superimposed on the configuration diagram image of that target plant to be compared at locations corresponding to the positional data of the respective fluid leak portions on the overall configuration diagram image, and to generate an image in which the generated leak portion display images are arranged, as the plant comparison information. Alternatively, the plant comparison information generating unit may be configured to generate, as the plant comparison information, data in which, with respect to the entirety of each of the target plants to be compared or with respect to each area in each of the target plants to be compared, a total number of fluid leak portions and a total amount of fluid leakage for each type of leaking fluid are arranged.

The management apparatus of the other embodiment (2) may also include a leak trend deducing unit that generates, from the results of a plurality of fluid leak diagnoses of the same plant that are cumulatively stored in the storage unit, fluid leak trend information indicating a chronological fluid leak trend in the target plant, and the plant comparison information generating unit may also be configured to generate, as the plant comparison information, data in which the sets of fluid leak trend information of the respective target plants to be compared are arranged.

In the management apparatus of other embodiment (2), operating conditions in the target plants to be compared may be input to the input unit, and the plant comparison information generating unit may also be configured to generate analysis result information obtained by analyzing the relationship of differences in fluid leaks between the target plants to be compared, the differences being indicated by data on fluid leak portions detected in fluid leak diagnoses of the respective target plants to be compared, with the differences in the operating conditions between the target plants to be compared. Furthermore, the plant comparison information generating unit may also be configured to generate evaluation information obtained by deducing the cause of the differences in fluid leaks between the target plants to be compared based on the analyzed relationship, and a proposal of measures to be taken against the cause in the target plants to be compared.

It should be noted that in the management apparatus of the other embodiment (2), the above-described configurations can be used not only alone but also in combination. Moreover, information generated by the leak trend deducing unit 35 can be used as the sets of fluid leak trend information to be compared in the plant comparison information. Furthermore, the management apparatus of the other embodiment (2) may also have the other functions of the host computer 24. Here, differences in fluid leaks mean differences in trend of various types of data, such as the distribution of fluid leak portions, the types of leaking fluid, and the amounts of fluid leakage, differences in chronological trend of fluid leaks from the past to the present, and the like, and differences in operating conditions between plants refer to equipment configurations of the plants, operating times, amounts of various fluids used, and the like.

(3) The function realized by the above-described diagnosis plan evaluating unit 37 can be realized by not only the host computer 24, but can also be realized by a fluid leakage data management apparatus including an input unit to which data on fluid leak portions collected through a fluid leak diagnosis of a plant is input, the management apparatus including a diagnosis plan evaluating unit that generates, based on the data input to the input unit in the middle of a fluid leak diagnosis of the plant that is performed according to a predetermined diagnosis plan, evaluation information regarding the diagnosis plan for the fluid leak diagnosis of the plant.

The management apparatus of the other embodiment (3) may also include a display unit on which the data input to the input unit is displayed, and the diagnosis plan evaluating unit may also be configured to generate, as the evaluation information, a diagnosis range display image in which the overall configuration diagram image of the plant is displayed such that a diagnosed region that has already been diagnosed in the fluid leak diagnosis and an undiagnosed region are differentiated from each other, and, with respect to the positional data indicating the positions, in the plant, of the respective leak portions input to the input unit, indicators representing the respective fluid leak portions are displayed superimposed on the diagnosis range display image at locations corresponding to the positional data of the respective fluid leak portions on the diagnosis range display image, and to display the diagnosis range display image on the display unit.

In the management apparatus of the other embodiment (3), the diagnosis plan evaluating unit may also be configured to analyze a trend in data on fluid leak portions detected in a fluid leak diagnosis of the plant and generate information for evaluating the appropriateness of the diagnosis plan based on the analyzed trend as the evaluation information. Furthermore, the diagnosis plan evaluating unit may also be configured to generate trend deduction information obtained by deducing a trend of fluid leaks in the undiagnosed region based on the analyzed trend.

The management apparatus of the other embodiment (3) may also include a storage unit in which the data input to the input unit is cumulatively stored, and the diagnosis plan evaluating unit may also be configured to generate the trend deduction information based on a trend of data on fluid leak portions detected in a past fluid leak diagnosis of the same or another plant cumulatively stored in the storage unit and the analyzed trend.

In the management apparatus of the other embodiment (3), the diagnosis plan evaluating unit may also be configured to generate a plan for fluid leak diagnosis of the undiagnosed region based on the trend deduction information.

It should be noted that, in the management apparatus of the other embodiment (3), the above-described configuration can be used not only alone but also in combination. Furthermore, the management apparatus of the other embodiment (3) may also have the other functions of the host computer 24.

(4) The function realized by the above-described pipe connection deducing unit 38 can also be realized by a method for deducing pipe connection, wherein a fluid leakage data management apparatus is used, the management apparatus including an input unit to which data on fluid leak portions collected through a fluid leak diagnosis of a plant is input, a display unit on which the data input to the input unit is displayed, and a data processing unit that displays, on the display unit, a leak portion display image in which, with respect to positional data indicating the positions, in the plant, of respective fluid leak portions occurring in piping of the plant, of the fluid leak portions input to the input unit, indicators representing the respective fluid leak portions are displayed superimposed on an overall configuration diagram image of the plant at locations corresponding to the positional data of the respective fluid leak portions on the overall configuration diagram image, and a connection state of the piping of the plant is deduced by referring to a piping diagram of the plant and the locations of the indicators in the leak portion display image.

In the method for deducing pipe connection of the other embodiment (4), when an indicator is located at a position on the leak portion display image where no pipe is shown on the piping diagram, a new pipe may be deduced to have been provided in the position corresponding to the indicator, a series of pipes on the piping diagram may be deduced to be in a connected state based on a distribution of the indicators on the leak portion display image, or when an indicator is located at a position on the leak portion display image, a position corresponding to an unused pipe to which the flow of fluid has been cut off on the piping diagram, the flow of fluid to the unused pipe may be deduced to have not been cut off.

Moreover, the function realized by the above-described pipe connection deducing unit 38 can be realized by not only the host computer 24 and the above-described method, but can also be realized by a fluid leakage data management apparatus including an input unit to which data on fluid leak portions collected through a fluid leak diagnosis of a plant is input, and a display unit on which the data input to the input unit is displayed, the management apparatus including a data processing unit that displays, on the display unit, a pipe connection deducing image in which, with respect to positional data on fluid leak portions occurring in piping of the plant, of positional data indicating the positions, in the plant, of the respective fluid leak portions input to the input unit, indicators representing the respective fluid leak portions are displayed superimposed on a piping diagram image of the plant at locations corresponding to the positional data of the respective fluid leak portions on the piping diagram image; or a fluid leakage data management apparatus including an input unit to which data on fluid leak portions collected through a fluid leak diagnosis of a plant is input, and a display unit on which the data input to the input unit is displayed, the management apparatus including a data processing unit that generates a leak portion display image in which, with respect to positional data of fluid leak portions occurring in piping of the plant, of positional data indicating the positions, in the plant, of the respective fluid leak portions input to the input unit, indicators representing the respective fluid leak portions are displayed superimposed on an overall configuration diagram image of the plant at locations corresponding to the positional data of the respective fluid leak portions on the overall configuration diagram image, the data processing unit being configured to display, on the display unit, a pipe connection deducing image in which a piping diagram image of the plant and an image of a range in the leak portion display image that corresponds to the piping diagram image are displayed next to each other.

In either of the above-described management apparatuses of the other embodiment (4), the data processing unit may be configured to display, on the pipe connection deducing image, an indicator in a highlighted manner when the indicator is located at a position where no pipe is shown, may be configured to deduce a series of pipes that are in a connected state based on a distribution of the indicators on the pipe connection deducing image, and to display the series of pipes that are deduced to be in the connected state on the pipe connection deducing image in a state in which the pipes are shown to be in the connected state, or may be configured to display, on the pipe connection deducing image, an indicator in a highlighted manner when the indicator is located at a position corresponding to an unused pipe to which the flow of fluid has been cut off, and in this configuration, may further be configured to display the unused pipe, of pipes shown on the pipe connection deducing image, such that the unused pipe is differentiated from the other pipes.

It should be noted that in the management apparatus of the other embodiment (4), the above-described configurations can be used not only alone, but can also be used in combination. Furthermore, the management apparatus of the other embodiment (4) may also have the other functions of the host computer 24. Any methods with which an indicator can be displayed in a highlighted manner compared with other indicators may be used as the method for highlighting an indicator, and examples thereof include displaying a large indicator, displaying the indicator in a different color, and displaying the indicator with a thick line. Moreover, with respect to the state in which the pipes are shown to be in the connected state, any methods with which pipes can be shown to be in a connected state may be used, and examples thereof include displaying a series of pipes that are deduced to be in a connected state in a highlighted manner, displaying those pipes in the same color, and displaying those pipes with lines drawn along them.

(5) The function realized by the above-described repair schedule producing unit 39 can be realized by not only the host computer 24, but can also be realized by a fluid leakage data management apparatus including an input unit to which data on fluid leak portions collected through a fluid leak diagnosis of a plant is input, and a data processing unit that generates, based on the data input to the input unit, sets of repair work data for the respective fluid leak portions in each of which data on each of the fluid leak portions is collected, wherein each of the sets of repair work data is composed of a device that leaks fluid and a detailed site of the fluid leak in the device, an image showing a photographed image of the fluid leak portion, with a mark being placed at a position corresponding to the fluid leak portion in that photographed image, and an image showing a configuration diagram image of the plant, with a mark being placed at a position corresponding to the fluid leak portion in that configuration diagram image, and the data processing unit is configured to generate a repair schedule in which the sets of repair work data for the respective fluid leak portions to be repaired are arranged in a predetermined order.

In the management apparatus of the other embodiment (5), the data processing unit may also be configured to determine the order of the repair schedule based on a total moving distance or a total moving time during repair work that is computed using the positional data indicating the positions, in the plant, of the respective fluid leak portions to be repaired, may furthermore be configured to determine the order of the repair schedule taking into account also the type of repair work that is determined depending on the device that is leaking fluid and the detailed site of the fluid leak in the device, or may be configured to select fluid leak portions to be repaired based on the amount of fluid leakage at each of the fluid leak portions.

It should be noted that in the management apparatus of the other embodiment (5), the above-described configurations can be used not only alone but also in combination. Furthermore, the management apparatus of the other embodiment (5) may have the other functions of the host computer 24.

(6) The function realized by the above-described compressor judging unit 41 can be realized by not only a management apparatus such as the host computer 24, but can also be realized by a fluid leakage data management apparatus including an input unit to which data on fluid leak portions collected through a fluid leak diagnosis of a plant is input, the management apparatus including a compressor judging unit that generates judgment information for judging, assuming the fluid leak portions in the target plant are repaired, whether the number of compressors used in the target plant and the models of the compressors are appropriate for the plant after repair, based on a total amount of fluid leakage in the target plant.

In the management apparatus of the other embodiment (6), the compressor judging unit may be configured to compute the post-repair fluid usage amount in the plant after repair by subtracting the total amount of fluid leakage from a total amount of fluid usage in the target plant, and to generate, as the judgment information, fluid amount comparison information in which the post-repair fluid usage amount and the deliverable amounts of fluid by the individual compressors, a deliverable amount of fluid referring to the amount of fluid that can be delivered by each compressor model, are collected, or may be configured to compute a converted amount of electric power by converting the total amount of fluid leakage into electric power, to compute the electric power consumption after repair, of the compressors in the plant after repair by subtracting the converted amount of electric power from a total electric power consumption of the compressors in the plant, and to generate, as the judgment information, electric power amount comparison information in which the electric power consumption after repair and maximum electric power consumption for each of the compressors, the maximum electric power consumption varying depending on the compressor model, are collected.

In the management apparatus of the other embodiment (6), the compressor judging unit may be configured to generate the fluid amount comparison information or the electric power amount comparison information for each type of leaking fluid.

In the management apparatus of the other embodiment (6), the compressor judging unit may be configured to judge whether the number of compressors and the models of the compressors are appropriate for the plant after repair based on the fluid amount comparison information or the electric power amount comparison information, and may furthermore be configured to propose an optimal combination of the number of compressors and the models of the compressors for the plant after repair.

It should be noted that in the management apparatus of the other embodiment (6), the above-described configurations can be used not only alone but also in combination. Furthermore, the management apparatus of the other embodiment (6) may also have the other functions of the host computer 24.

(7) Further Other Embodiments

The area map image Pa stored in the storage unit 18 of the mobile computer 2 can be input to the mobile computer 2 using appropriate means. For example, the area map image Pa may be input to the mobile computer 2 from the host computer 24 via wired or wireless communication means. Moreover, when necessary, for example, when the diagnosis staff has moved to an area different from the area map image Pa stored in the storage unit 18 during a diagnosis operation, a new area map image Pa may also be sent to the leakage detecting device R from the host computer, whenever necessary, via wireless communication means.

Although the configuration in which the collected data D accumulated and stored in the storage unit 18 of the mobile computer 2 is collectively input to the host computer 24 side is described above, a configuration may also be adopted in which the collected data D on fluid leak portions is sent to the host computer 24, whenever necessary, during the diagnosis operation via wireless communication.

INDUSTRIAL APPLICABILITY

The fluid leakage data management apparatus and management system according to the present disclosure can be applied to management of fluid leakage data of various plants in various fields.

DESCRIPTION OF REFERENCE SIGNS

19: Display
24: Host computer (management apparatus)
26: Operation unit (leaking fluid type selecting unit, scaling instructing unit, ratio instructing unit, indicator selecting unit)
27: Input unit
28: Storage unit
29: Computing unit (data processing unit)
30: Display unit
D: Collected data (data on fluid leak portion)
Ma: Mark
Pa: Area map image (image showing diagnosis area)
Pe: Map image (leak portion display image)
R: Portable leakage detecting device

The invention claimed is:

1. A fluid leakage data management apparatus comprising:
   a portable leakage detecting device used for a fluid leak diagnosis of at least a piping system of a plant, wherein the leakage detecting device comprises:
     a detecting unit which can detect fluid leakage;
     a display of the leakage detecting device displaying area map images, each of the area map images indicating a diagnosis area of the plant;
     a detected position input unit to which detected positional data can be input, the detected positional data being positions, in the area map image, of the fluid leak portions at which fluid leakage is detected; and
     a storage unit in which the detected positional data input is stored,
   wherein the leakage detecting device is configured so that in a state in which the area map image is displayed on the display of the leakage detecting device, when a mark indicating the position of the fluid leak portion in the diagnosis area is added to the area map image in accordance with a manual position indicating operation, the position indicated by the mark on the area map image is used as the detected positional data, and the detected positional data is input to the detected position input unit, and
   a management apparatus managing data on fluid leak portions collected through the leakage detecting device, wherein the management apparatus comprises:
     an input unit to which data on fluid leak portions collected through a fluid leak diagnosis of a plant can be input;
     a display unit on which the data input to the input unit is displayed; and
     a data processing unit that is configured to:
       determine positional data on fluid leak portions occurring in piping of the plant, of positional data indicating the positions, in the plant, of the respective fluid leak portions input to the input unit by converting coordinate values in the area map image, which represent the position indicated by the mark on the area map image, which is the detected positional data input, into coordinate values in a piping diagram image of the plant, the converted coordinate values being used as the positional data on the piping diagram image of the plant,
       display, on the display unit, a pipe connection deducing image in which indicators representing respective fluid leak portions are displayed superimposed on the piping diagram image of the plant at locations corresponding to the converted coordinate values of the positional data of the respective fluid leak portions on the piping diagram image, wherein the piping diagram image shows a plurality of pipes,
       determine, based on the piping diagram image and the pipe connection deducing image, that the piping diagram image does not show a pipe at a position corresponding to the positional data of a fluid leak portion in the pipe connection deducing image;
       in response to determining that the piping diagram image does not show a pipe at the position corresponding to the positional data of the fluid leak portion, determine that a new pipe was provided at that position after the plant was constructed,
       display, on the pipe connection deducing image, an indicator representative of the fluid leak portion in a highlighted manner at the position where no pipe is shown, and
       update the piping diagram image to show a pipe at the position corresponding to the positional data of the fluid leak portion.

2. The management apparatus according to claim 1, wherein the data processing unit is further configured to:
   determine, based on the piping diagram image and the pipe connection deducing image, that another fluid leak portion is located on an unused pipe to which the piping diagram indicates the flow of fluid has been cut off, wherein the unused pipe is displayed in the piping diagram differentiated from other pipes that are in use,
   in response to determining that the another fluid leak portion is located on the unused pipe to which the piping diagram indicates the flow of fluid has been cut off, determine that the flow of fluid to that unused pipe has not been completely cut off, and
   display, on the pipe connection deducing image, an indicator in a highlighted manner at a position corresponding to the unused pipe to which the piping diagram indicates the flow of fluid has been cut off.

3. A fluid leakage data management apparatus comprising:
   a portable leakage detecting device used for a fluid leak diagnosis of at least a piping system of a plant, wherein the leakage detecting device comprises:
     a detecting unit which can detect fluid leakage;
     a display of the leakage detecting device displaying area map images, each of the area map images indicating a diagnosis area of the plant;
     a detected position input unit to which detected positional data can be input, the detected positional data being positions, in the area map image, of the fluid leak portions at which fluid leakage is detected; and
     a storage unit in which the detected positional data input is stored,
   wherein the leakage detecting device is configured so that in a state in which the area map image is displayed on the display of the leakage detecting device, when a mark indicating the position of the fluid leak portion in the diagnosis area is added to the area map image in accordance with a manual position indicating operation, the position indicated by the mark on the area map image is used as the detected positional data, and the detected positional data is input to the detected position input unit, and a management apparatus managing data on fluid leak portions collected through the leakage detecting device, wherein the management apparatus comprises:
  an input unit to which data on fluid leak portions collected through a fluid leak diagnosis of a plant can be input,
  a display unit on which the data input to the input unit is displayed, and
  a data processing unit that is configured to:
    determine positional data of fluid leak portions occurring in piping of the plant, indicating the positions, in the plant, of the respective fluid leak portions input to the input unit by converting coordinate values in the area map image, which represent the position indicated by the mark on the area map image, which is the detected positional data input, into coordinate values in a configuration diagram image of the plant, the converted coordinate values being used as the positional data on the configuration diagram image of the plant,
    generate a leak portion display image in which indicators representing the respective fluid leak portions are displayed superimposed on a configuration diagram image of the plant at locations corresponding to the converted coordinate values of the positional data of the respective fluid leak portions on the configuration diagram image,
    display, on the display unit, a pipe connection deducing image in which a piping diagram image of the plant and an image of a range in the leak portion display image that corresponds to the piping diagram image are displayed next to each other, wherein the piping diagram image shows a plurality of pipes,
    determine, based on the piping diagram image and the pipe connection deducing image, that the piping diagram image does not show a pipe at a position corresponding to the positional data of a fluid leak portion in the pipe connection deducing image;
    in response to determining that the piping diagram image does not show a pipe at the position corresponding to the positional data of the fluid leak portion, determine that a new pipe was provided at that position after the plant was constructed,
    display, on the pipe connection deducing image, an indicator representative of the fluid leak portion in a highlighted manner at the position where no pipe is shown, and
    update the piping diagram image to show a pipe at the position corresponding to the positional data of the fluid leak portion.

4. The management apparatus according to claim 3, wherein the data processing unit is further configured to:
  determine, based on the piping diagram image and the pipe connection deducing image, that another fluid leak portion is located on an unused pipe to which the piping diagram indicates the flow of fluid has been cut off, wherein the unused pipe is displayed in the piping diagram differentiated from other pipes that are in use,
  in response to determining that the another fluid leak portion is located on the unused pipe to which the piping diagram indicates the flow of fluid has been cut off, determine that the flow of fluid to that unused pipe has not been completely cut off, and
  display, on the pipe connection deducing image, an indicator in a highlighted manner at a position corresponding to the unused pipe to which the piping diagram indicates the flow of fluid has been cut off.

5. A method for deducing pipe connection, wherein the fluid leakage data management apparatus of claim 3 is used, the method including:
  detecting fluid leakage from each portion of a piping system and a vessel system of the plant by the detecting unit of the leakage detecting device;
  inputting detected positional data to the detected position input unit when the fluid leakage is detected, the detected positional data indicating positions, in the area map image, of respective fluid leak portions that have been detected;
  inputting the detected positional data collected through the leakage detecting device into the input unit of the management apparatus after a predetermined diagnostic process has been completed;
  converting the coordinate values in the area map image, which represent the position indicated by the mark on the area map image, which is the detected positional data input, into the coordinate values in the overall configuration diagram image of the plant, the converted coordinate values being used as the positional data on the overall configuration diagram image, and generating a leak portion display image in which, with respect to the overall configuration diagram image, indicators representing the fluid leak portions are displayed superimposed on locations corresponding to the converted coordinate values on the overall configuration diagram image by the data processing unit;
  displaying on a display unit of the fluid leakage data management apparatus the leak portion display image in which indicators representing the respective fluid leak portions are displayed superimposed on the configuration diagram image of the plant at locations corresponding to the converted coordinate values of the positional data of the respective fluid leak portions on the configuration diagram image, wherein the configuration diagram image shows a plurality of pipes;
  determining, based on the configuration diagram image and the leak portion display image, that the configuration diagram image does not show a pipe at a position corresponding to the positional data of a fluid leak portion in the leak portion display image;
  in response to determining that the configuration diagram image does not show a pipe at the position corresponding to the positional data of the fluid leak portion, determining that a new pipe was provided at that position after the plant was constructed,
  displaying, on the leak portion display image, an indicator representative of the fluid leak portion in a highlighted manner at the position where no pipe is shown, and
  updating the configuration diagram image to show a pipe at the position corresponding to the positional data of the fluid leak portion.

* * * * *